(12) United States Patent
Simmons et al.

(10) Patent No.: US 12,387,366 B2
(45) Date of Patent: Aug. 12, 2025

(54) IMAGE BASED DETECTION OF FIT FOR A HEAD MOUNTED WEARABLE COMPUTING DEVICE

(71) Applicant: GOOGLE LLC, Mountain View, CA (US)

(72) Inventors: Rees Anwyl Samuel Simmons, Waterloo (CA); Idris Syed Aleem, Kitchener (CA); Sushant Umesh Kulkarni, Waterloo (CA); Mayank Bhargava, Kitchener (CA); Ahmed Gawish, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 836 days.

(21) Appl. No.: 17/444,963

(22) Filed: Aug. 12, 2021

(65) Prior Publication Data
US 2023/0046950 A1    Feb. 16, 2023

(51) Int. Cl.
*G06T 7/73* (2017.01)
*G02B 27/01* (2006.01)
(Continued)

(52) U.S. Cl.
CPC .............. *G06T 7/73* (2017.01); *G02B 27/017* (2013.01); *G02B 27/0176* (2013.01);
(Continued)

(58) Field of Classification Search
None
See application file for complete search history.

(56) References Cited

U.S. PATENT DOCUMENTS

2013/0322683 A1* 12/2013 Jacobs .............. G02B 27/0149
                                                        382/103
2014/0218679 A1    8/2014 Haddadi
(Continued)

FOREIGN PATENT DOCUMENTS

EP          3339943 A1 *  6/2018
JP       2006155638 A     6/2006
(Continued)

OTHER PUBLICATIONS

International Search Report and Written Opinion for PCT Application No. PCT/US2022/073931, mailed on Nov. 15, 2022, 10 pages.

*Primary Examiner* — Delomia L Gilliard
(74) *Attorney, Agent, or Firm* — Brake Hughes Bellermann LLP

(57) ABSTRACT

A system and method of detecting display fit measurements and/or ophthalmic measurements for a head mounted wearable computing device including a display device is provided. An image of a fitting frame worn by a user of the computing device is captured by the user, through an application running on the computing device. One or more keypoints and/or features and/or landmarks are detected in the image including the fitting frame. A three-dimensional pose of the fitting frame is determined based on the detected keypoints and/or features and/or landmarks, and configuration information associated with the fitting frame. The display device of the head mounted wearable computing device can then be configured based on the three-dimensional pose of the fitting frame as captured in the image.

17 Claims, 17 Drawing Sheets

(51) Int. Cl.
  *G02C 7/02* (2006.01)
  *G02C 13/00* (2006.01)
  *G06V 40/16* (2022.01)

(52) U.S. Cl.
  CPC ........... *G02C 7/027* (2013.01); *G02C 13/003* (2013.01); *G06V 40/165* (2022.01); *G02B 27/0149* (2013.01); *G02B 2027/0154* (2013.01); *G02B 2027/0178* (2013.01)

(56) References Cited

U.S. PATENT DOCUMENTS

| | | | |
|---|---|---|---|
| 2015/0055086 A1* | 2/2015 | Fonte | H04L 65/403 700/98 |
| 2016/0124246 A1 | 5/2016 | Rego et al. | |
| 2019/0146246 A1 | 5/2019 | Fonte et al. | |
| 2020/0103675 A1* | 4/2020 | Schwarz | G06F 30/27 |

FOREIGN PATENT DOCUMENTS

| | | | |
|---|---|---|---|
| JP | 2012239566 A | 12/2012 | |
| JP | 2016537716 A | 12/2016 | |

\* cited by examiner

IMAGE BASED DETECTION OF FIT FOR A HEAD MOUNTED WEARABLE COMPUTING DEVICE

TECHNICAL FIELD

This description relates in general to the prediction of wearable fit and/or display fit and/or ophthalmic fit of a wearable device, and in particular to the prediction of display fit and ophthalmic fit of a head worn computing device including display capability.

BACKGROUND

Wearable devices may include head worn devices including, for example, smart glasses, headsets, ear buds and the like, wrist and/or hand worn devices such as smart watches, smart bracelets, smart rings and the like, smart pendants, fitness trackers, cameras, body sensors, and other such devices. In some examples, a user may want to select and/or customize a wearable device for fit and/or function. For example, a user may wish to select and/or customize a pair of smart glasses to include selection of frames, incorporation of prescription lenses, and other such features. Existing systems for procurement of these types of wearable devices do not provide for accurate fitting and customization, particularly without access to a retail establishment.

SUMMARY

In one general aspect, a method of detecting display fit measurements for a head mounted wearable computing device including a display device includes detecting, by an application executing on a computing device, at least one keypoint on a fitting frame worn by a user from an image captured by a computing device; accessing configuration information associated with the fitting frame detected in the image; determining a three-dimensional pose of the fitting frame captured in the image based on the detecting of the at least one keypoint and the configuration information associated with the fitting frame; and determining a configuration of the display device of the head mounted wearable computing device based on the three-dimensional pose of the fitting frame as captured in the image.

In some implementations, detecting the at least one keypoint includes detecting at least one of a bridge portion of the fitting frame; a hinge point between a rim portion and an arm portion of the fitting frame; a peripheral edge portion of a lens of the fitting frame; or a saddle portion of the arm portion of the fitting frame.

In some implementations, determining the three-dimensional pose of the fitting frame includes accessing a three-dimensional model of the fitting frame captured in the image; and performing a comparison, including comparing a known position and orientation of the at least one keypoint detected in the image to a corresponding position and orientation of the at least one keypoint in the three-dimensional model of the fitting frame. Detecting at least one keypoint may include detecting a plurality of keypoints on the fitting frame in the image captured by the computing device; and performing the comparison may include, for each of the plurality of keypoints, comparing a known position and orientation of the keypoint detected in the image to a corresponding position and orientation of the keypoint in the three-dimensional model of the fitting frame. Determining the three-dimensional pose of the fitting frame may include performing a correspondence between a two-dimensional position of each keypoint detected in the image to a corresponding three-dimensional position of the respective keypoint in the three-dimensional model of the fitting frame.

In some implementations, the method may also include detecting a plurality of facial landmarks in the captured image; and determining ophthalmic fit measurements for the head mounted wearable computing device based on the detected plurality of facial landmarks. Detecting the plurality of facial landmarks may include detecting a pupil height in the image of the fitting frame worn by the user; detecting at least one of an interpupillary distance or a monocular pupil distance in the image of the fitting frame worn by the user; and determining a pantoscopic angle of the fitting frame worn by the user based on the determined three-dimensional pose of the fitting frame and the detected plurality of facial landmarks. Determining the configuration of the display device of the head mounted wearable computing device based on the three-dimensional pose of the fitting frame as captured in the image may include adapting the configuration of the display device of the head mounted wearable computing device to accommodate the ophthalmic fit measurements. Determining the configuration of the display device of the head mounted wearable computing device may include determining a user field of view based on the ophthalmic fit measurements and the three-dimensional pose of the fitting frame; and configuring an output coupler of the display device such that content output by the display device is displayed within the determined field of view.

In another general aspect, a non-transitory computer-readable medium may store executable instructions that, when executed by at least one processor, are configured to cause the at least one processor to capture an image of a fitting frame worn by a user; detect at least one keypoint on the fitting frame from the captured image; access configuration information associated with the fitting frame; determine a three-dimensional pose of the fitting frame captured in the image based on the detection of the at least one keypoint and the configuration information associated with the fitting frame; and determine a configuration of a display device of a head mounted wearable computing device based on the three-dimensional pose of the fitting frame as captured in the image.

In some implementations, the instructions cause the at least one processor to detect the at least one keypoint on the fitting frame in the captured image, including at least one of detect a first keypoint including a bridge portion of the fitting frame; detect a second keypoint including a hinge portion between a rim portion and an arm portion of the fitting frame; detect a third keypoint including a peripheral edge portion of a lens of the fitting frame; or detect a fourth keypoint including a saddle portion of the arm portion of the fitting frame. In some implementations, the instructions cause the at least one processor to determine the three-dimensional pose of the fitting frame, including access a three-dimensional model of the fitting frame captured in the image; and perform a comparison between a known position and orientation of the at least one keypoint detected in the image to a corresponding position and orientation of the at least one keypoint in the three-dimensional model of the fitting frame.

In some implementations, the instructions cause the at least one processor to detect a plurality of keypoints, and to perform the comparison, including, for each of the plurality of keypoints, compare a known position and orientation of the keypoint detected in the image to a corresponding position and orientation of the keypoint in the three-dimensional model of the fitting frame. In some implementations, the instructions cause the at least one processor to determine the three-dimensional pose, including performing a correspondence between a two-dimensional position of each keypoint detected in the image to a corresponding three-dimensional position of the respective keypoint in the three-dimensional model of the fitting frame.

In some implementations, the instructions also cause the at least one processor to detect a plurality of facial landmarks in the captured image; and determine ophthalmic fit measurements for the head mounted wearable computing device based on the detected plurality of facial landmarks. The instructions may cause the at least one processor to detect the plurality of facial landmarks, including detect a pupil height in the image of the fitting frame worn by the user; detect at least one of an interpupillary distance or a monocular pupil distance in the image of the fitting frame worn by the user; and determine a pantoscopic angle of the fitting frame worn by the user based on the determined three-dimensional pose of the fitting frame and the detected plurality of facial landmarks. In some implementations, the instructions cause the at least one processor to adapt the configuration of the display device of the head mounted wearable computing device to accommodate the ophthalmic fit measurements, including determine a user field of view based on the ophthalmic fit measurements and the three-dimensional pose of the fitting frame; and configure an output coupler of the display device such that content output by the display device is displayed within the determined field of view.

The details of one or more implementations are set forth in the accompanying drawings and the description below. Other features will be apparent from the description and drawings, and from the claims.

DETAILED DESCRIPTION

This disclosure relates to systems and methods for selection and fitting of a wearable computing device, including the determination of wearable fit and/or display fit and/or ophthalmic fit parameters associated with the wearable computing device. Systems and methods, in accordance with implementations described herein, provide for the determination of wearable fit and/or display fit and/or ophthalmic fit for a wearable computing device based on measurements detected within image data. In some implementations, systems and methods, in accordance with implementations described herein, provide for the detection of wearable fit and/or display fit and/or ophthalmic fit based on known parameters associated with a sample frame of the wearable computing device detected within the image data. In some examples, systems and methods as described herein provide for the detection of wearable fit and/or display fit and/or ophthalmic fit from image data, for wearable computing devices in the form of smart glasses that include a display and/or corrective/prescription lenses that are customized for the particular physical attributes, needs and preferences of a particular user. Systems and methods, in accordance with implementations described herein, may facilitate the capture of image data for the detection of measurement data by the user in a self-directed, or unsupervised, or unproctored manner, without access to a retail establishment and/or an in-person or virtual appointment with a sales agent.

Hereinafter, systems and methods, in accordance with implementations described herein, will be described with respect to the fitting of a wearable computing device in the form of a head mounted display device, such as, for example, smart glasses including a display device, such that content displayed by the display device is viewable by/visible to a user wearing the wearable computing device. In a situation in which the user would benefit from a head mounted wearable computing device including corrective lenses, systems and methods as described herein may provide for the determination of ophthalmic fit measurements, allowing for the incorporation of corrective/prescription lenses into the head mounted wearable computing device, while taking into account the features of the corrective/prescription lenses in the configuration of the display device for the head mounted wearable computing device. That is, systems and methods, in accordance with implementations described herein, may employ an image based capture system and method to provide for the fitting of a display device and corrective/prescription lenses such that content displayed by the display device is visible to the user wearing the head mounted wearable computing device.

Figure 1A:
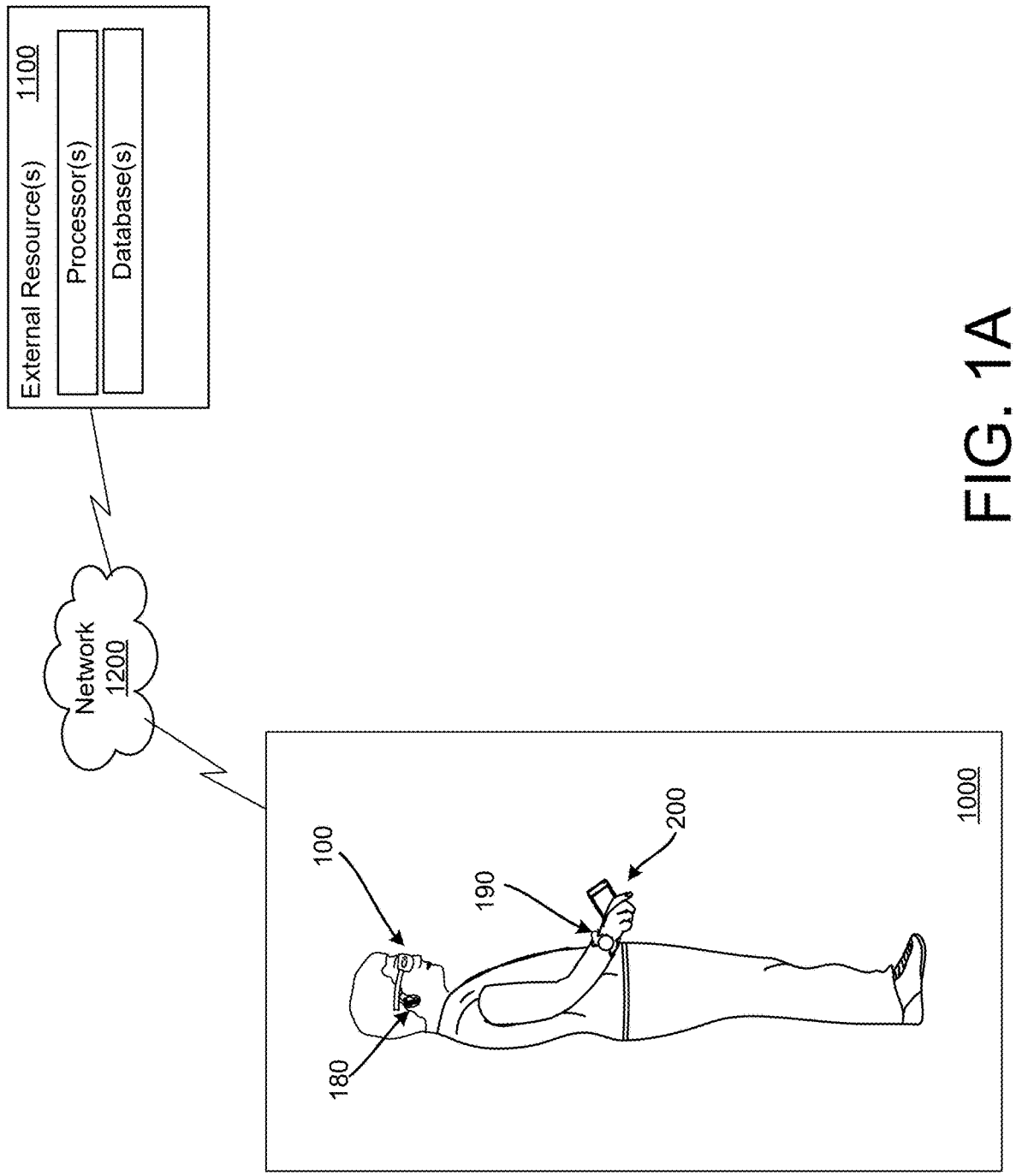
FIG. 1A illustrates an example system, in accordance with implementations described herein.

FIG. 1A illustrates a user operating mobile computing devices in a system in which the mobile computing devices can access one or more external resources 1100 via a network 1200. FIG. 1A provides a third person view of the user in an ambient environment 1000, including various examples of mobile computing devices 100, 180, 190, 200. The example mobile computing devices shown in FIG. 1A include a first head worn wearable computing device 100, a second head worn wearable computing device 180, a wrist worn computing device 190, and a handheld computing device 200. In some examples, the first head worn computing device 100 can include various components including for example a display, a camera that can capture images of the ambient environment, audio input/output capability, user input capability and the like, such as in a head mounted display device, in the form of smart glasses, or a headset. In some examples, the second head worn computing device 180 can be an ear worn computing device such as headphones, or earbuds, and can include audio input/output capability, a camera that can capture images of the ambient environment, user input capability and the like. In some examples, the wrist worn computing device 190 can include a display, a camera that can capture images of the ambient environment, audio input/output capability, user input capability and the like, such as in a smart watch, or wristband. In some examples, the handheld computing device 200 can include a display, a camera that can capture images of the ambient environment, audio input/output capability, user input capability, and the like, such as in a smartphone. FIG. 1A illustrates just some examples of mobile computing devices. The principles to be described herein may be applied to other types of mobile computing devices not specifically shown in FIG. 1A. In some examples, the mobile computing devices, including the example computing devices shown in FIG. 1A, can communicate with each other and/or with the external resources 1100, to exchange information, to receive and transmit input and/or output, and the like.

Figure 1B:
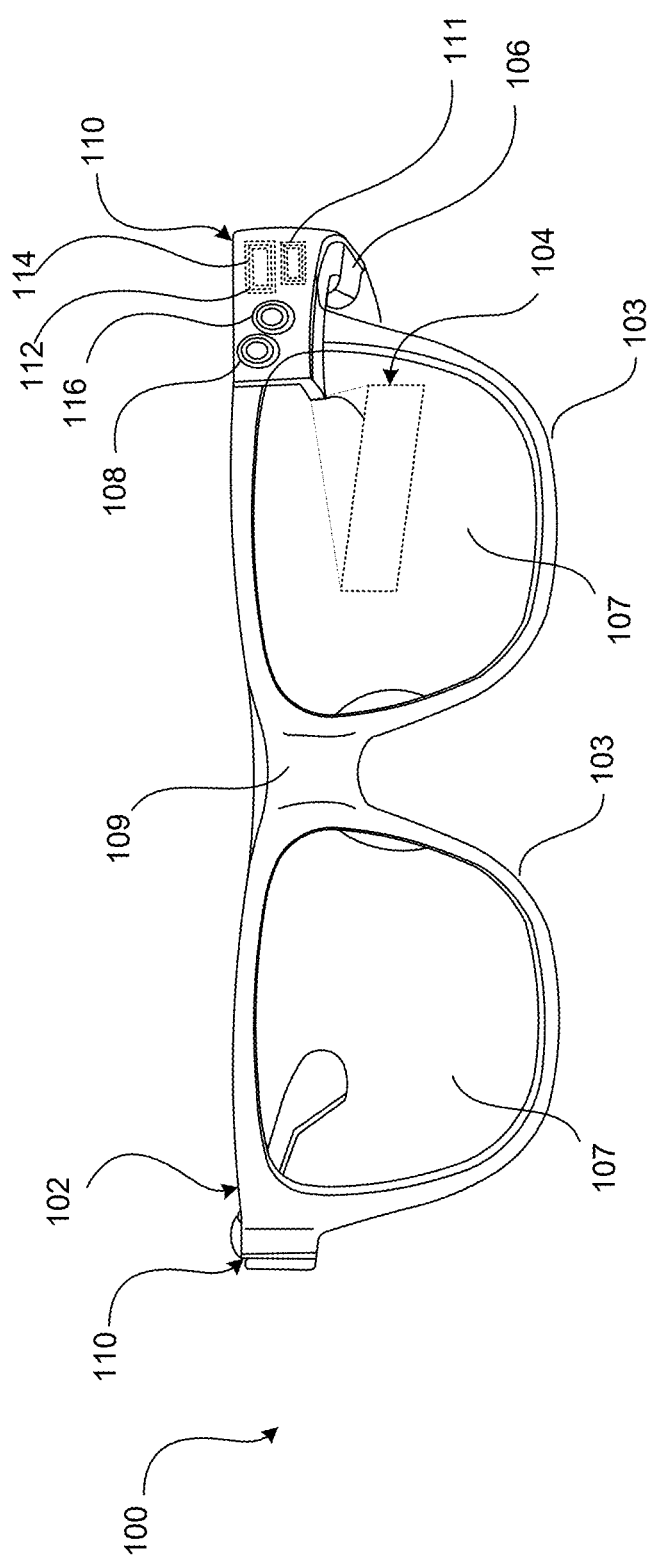
FIG. 1B is a front view.
Figure 1C:
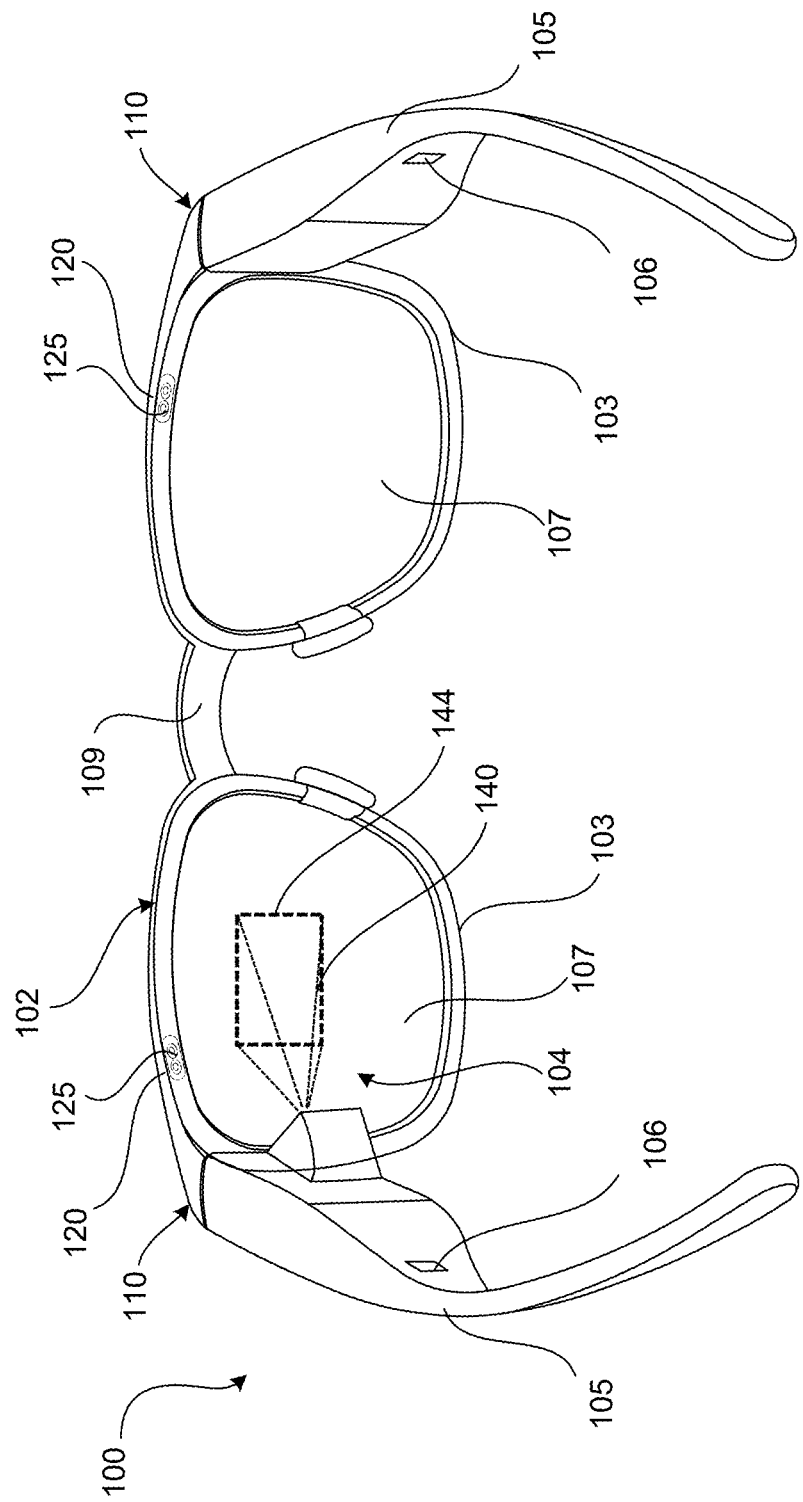
FIG. 1C is a rear view, of an example wearable computing device shown in FIG. 1A, in accordance with implementations described herein.

FIG. 1B is a front view, and FIG. 1C is a rear view, of the example head mounted wearable computing device 100 shown in FIG. 1A. In some implementations, the example head mounted wearable computing device 100 may take the form of a pair of smart glasses, or augmented reality glasses, as in the example shown in FIGS. 1B and 1C, or an augmented reality and/or virtual reality headset or goggles, and the like. Hereinafter, systems and methods in accordance with implementations described herein will be described with respect to the wearable computing device 100 in the form of smart glasses, simply for ease of discussion and illustration. The principles to be described herein can be applied to other types of wearable computing devices and/or combinations of mobile/wearable computing devices working together.

As shown in FIG. 1B, the example head mounted wearable computing device 100 includes a frame 102. In the example shown in FIGS. 1B and 1C, the frame 102 includes rim portions 103 surrounding glass portion(s) 107, or lenses 107. Arm portions 105 are coupled, for example, pivotably or rotatably coupled, to a respective rim portion 103 of the frame 102 by a respective hinge portion 110. In some examples, the lenses 107 may be corrective/prescription lenses. In some examples, the lenses 107 may be glass portions that do not necessarily incorporate corrective/prescription parameters. In some examples, a bridge portion 109 may connect the rim portions 103 of the frame 102. A display device 104 may be coupled in a portion of the frame 102. In the example shown in FIGS. 1B and 1C, the display device 104 is coupled in the arm portion 105 of the frame 102. With the display device 104 coupled in the arm portion 105, an eye box 140 extends toward the lens(es) 107, for output of content at an output coupler 144 at which content output by the display device 104 may be visible to the user. In some examples, the output coupler 144 may be substantially coincident with the lens(es) 107. The head mounted wearable computing device 100 can also include an audio output device 106 (such as, for example, one or more speakers), an illumination device 108, a sensing system 111, a control system 112, at least one processor 114, and an outward facing image sensor 116, or camera 116. In some implementations, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

In some implementations, the wearable computing device 100 may include a gaze tracking device 120 including, for example, one or more sensors 125, to detect and track eye gaze direction and movement. Data captured by the sensor(s) 125 may be processed to detect and track gaze direction and movement as a user input. In some implementations, the sensing system 111 may include various sensing devices and the control system 112 may include various control system devices including, for example, one or more processors 114 operably coupled to the components of the control system 112. In some implementations, the control system 112 may include a communication module providing for communication and exchange of information between the wearable computing device 100 and other external devices.

Numerous different sizing and fitting measurements and/or parameters may be taken into account when sizing and fitting the wearable computing device 100, such as the example smart glasses shown in FIGS. 1A-IC, for a particular user. This may include, for example, wearable fit parameters, or wearable fit measurements. Wearable fit parameters/measurements may take into account how a particular frame 102 fits and/or looks and/or feels on a particular user. Wearable fit parameters/measurements may take into consideration numerous factors such as, for example, whether the frame 102 is wide enough to be comfortable with respect to the temples yet also not so wide that the frame 102 cannot remain relatively stationary when worn by the user (i.e., too big, or too wide). Wearable fit parameters/measurements may take into consideration other factors such as whether the rim portions 103 and bridge portion 109 are sized so that the bridge portion 109 can rest comfortably on the bridge of the user's nose, whether the arm portions 105 are sized to comfortably rest on the user's ears, and other such comfort related considerations. Wearable fit parameters/measurements may take into account as-worn considerations including how the user naturally wears the frame 102, such as, for example, head posture/how the user naturally holds his/her head, how the user positions the frame relative to his/her face, and the like. Wearable fit parameters/measurements may take into account whether the size and/or shape and/or contour of the frame 102 is aesthetically pleasing to the user, and is compatible with the user's facial features. In some examples, wearable fit parameters/measurements may take into account whether a fit associated with a particular frame configuration can accommodate incorporation of a display device such that a display area can be coordinated with the natural field of view of the user. In some examples, wearable fit parameters may take into account whether an eye tracking camera arrangement associated with a particular frame configuration can effectively track user eye gaze and movement.

Display fit parameters, or display fit measurements may be taken into account when sizing and fitting the wearable computing device 100 for a particular user. Display fit parameters/measurements may be used to configure the display device 104 for a set of frames 102 for a particular user, so that content displayed by the display device 104 is visible to the user. For example, display fit parameters/measurements may provide an indication of placement of the display device 104 so that content displayed by the display device 104 is captured within at least a set portion of the field of view of the user. For example, the display fit parameters/measurements may be used to configure the display device 104 to provide at least a set level of gazability, corresponding to an amount, or portion, or percentage of the display of content that is visible to the user at a set brightness level and a set pupil size at a periphery (for example, a least visible corner) of the field of view of the user. The display fit parameters/measurements may be used to configure the display device 104 to provide the best possible placement of the display of content to the user for a particular set of frames 102.

Figure 2A:
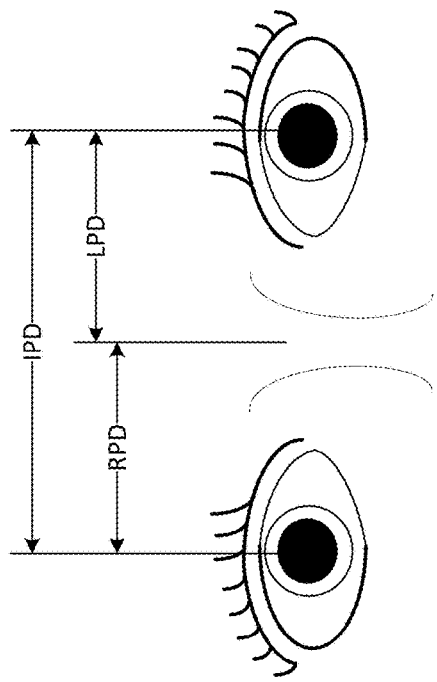
FIGS. 2A-2D illustrate example ophthalmic measurements.
Figure 2B:
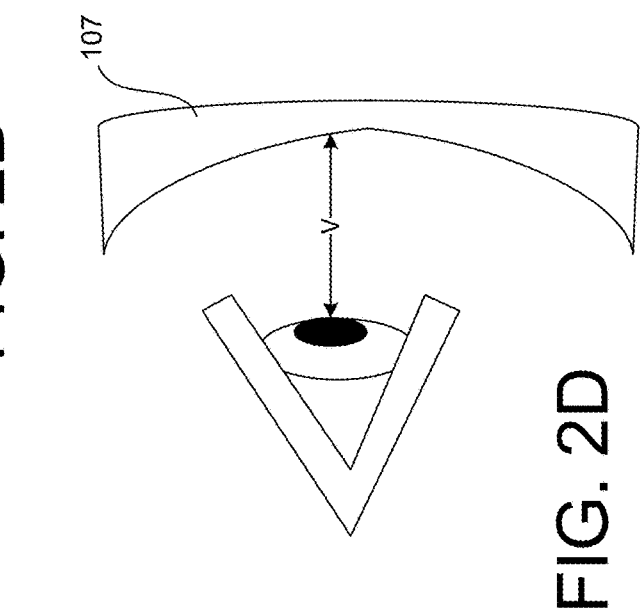
Figure 2C:
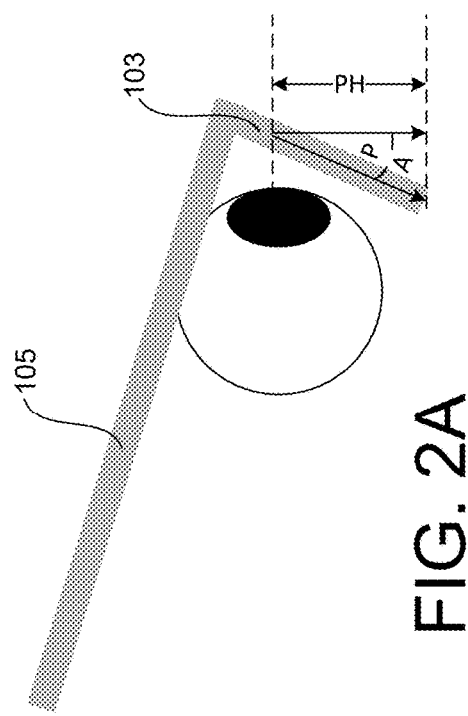
Figure 2D:
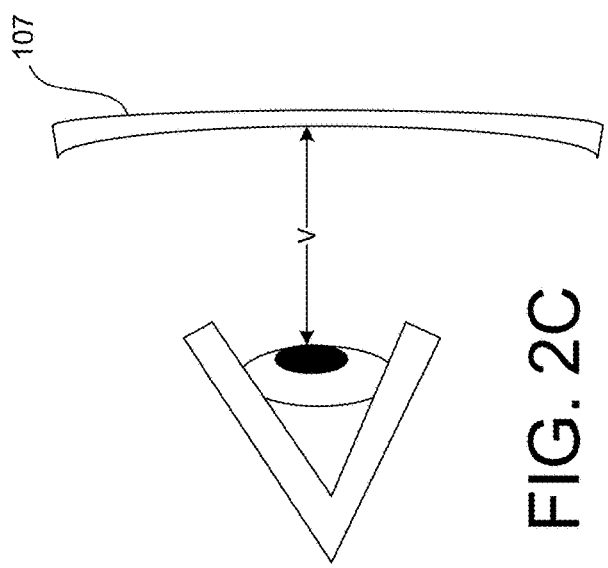

In some examples, ophthalmic fit parameters, or ophthalmic fit measurements may be taken into account when sizing and fitting the wearable computing device 100 including prescription, or corrective lenses 107. Some example ophthalmic fit measurements are shown in FIGS. 2A-2D. Ophthalmic fit measurements may include, for example, a pupil height PH (a distance from a center of the pupil to a bottom of the lens 107), including for example, a left pupil height and a right pupil height. Ophthalmic fit measurements may include an interpupillary distance IPD (a distance between the pupils). IPD may be characterized by a monocular pupil distance, for example, a left pupil distance LPD (a distance from a central portion of the bridge of the nose to the left pupil) and a right pupil distance RPD (a distance from the central portion of the bridge of nose to right pupil). Ophthalmic fit measurements may include a pantoscopic angle PA (an angle defined by the tilt of the lens 107 with respect to vertical). Ophthalmic fit measurements may include a vertex distance V (a distance from the cornea to the lens 107) including, for example a left vertex distance and a right vertex distance. Ophthalmic fit measurements may include other such parameters, or measures that provide for the sizing and/or fitting of a head mounted wearable computing device 100 including a display device 104 as described above. FIG. 2C illustrates a vertex distance V associated with a relatively lower diopter lens 107. FIG. 2D illustrates a vertex distance V associated with a relatively higher diopter lens 107. Ophthalmic fit measurements may be taken into account when fitting the wearable computing device 100, including the display device 104, for the user. For example, ophthalmic fit measurements (together with display fit measurements) may provide for placement of the display of content by the display device 104 within an eye box defined by a three-dimensional volume extending between the lens 107 and the eye of the user, where the display of content will be within the field of view of the user, and within a corrected field of view of the user, and thus visible to the user.

In a system and method, in accordance with implementations described herein, image data may be captured via an application executing on a computing device operated by the user, such as the computing device 200 described above with respect to FIG. 1A, or other computing device operated by the user. Wearable fit measurements and/or display fit measurements and/or ophthalmic fit measurements may be detected from image data obtained in this manner to size and fit a head mounted wearable computing device, such as the wearable computing device 100 described above including a display and/or corrective lenses for a specific user. The image data may be captured via an application executing on the computing device 200 operated by the user in an unsupervised, or unproctored manner, without the need for access to a retail establishment, without the need for an appointment with a fitting/sales professional and the like. In some implementations, the detection of the wearable fit and/or display fit and/or ophthalmic fit measurements may be based on detection of physical features or attributes of sample frames worn by the user included in the image data. A three-dimensional model of the head of the user may be generated, or produced, or defined, based on measurements (for example, measurements of physical attributes of the user) detected within the captured image data. In some implementations, detection of the physical features and/or attributes in the image data may provide for this detection using an image sensor, or camera, of the computing device 200 without relying on data collected by a depth sensor. In some implementations, a depth sensor included in the computing device 200 may provide for the collection of three-dimensional measures associated with the detected physical features and/or attributes of the sample frames and/or facial/cranial features of the user.

Figure 3:
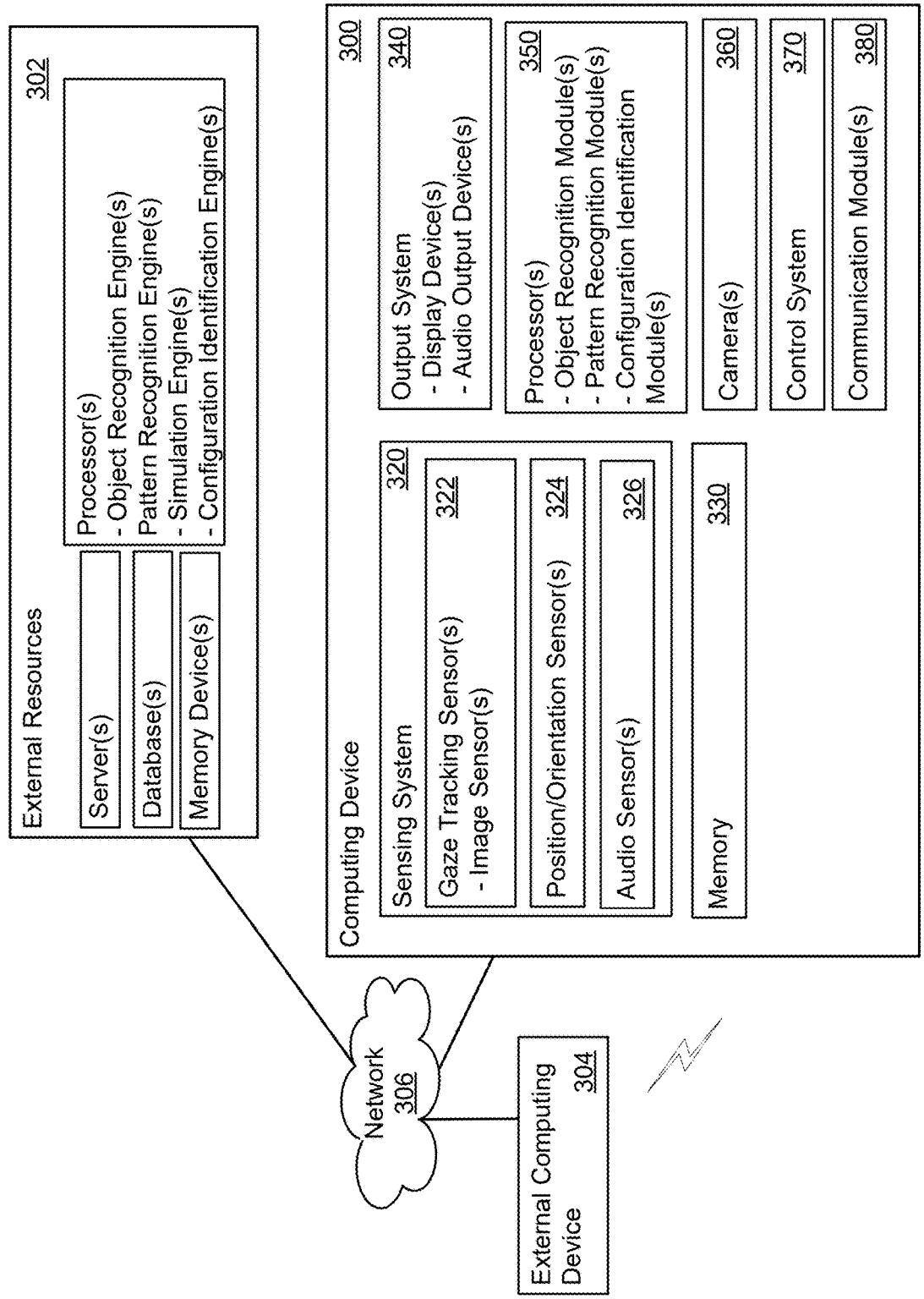
FIG. 3 is a block diagram of a system, in accordance with implementations described herein.

FIG. 3 is a block diagram of an example system for determining display fit measurements and ophthalmic fit measurements for a wearable computing device, in accordance with implementations described herein. The system may include one or more computing devices 300. The computing device 300 can communicate selectively via a network 306 to access external resources 302 such as, for example, server computer systems, processors, databases, memory storage, and the like. The computing device 300 can operate under the control of a control system 370. The computing device 300 can communicate with one or more external computing devices 304 (another wearable computing device, another mobile computing device and the like) either directly (via wired and/or wireless communication), or via the network 306. In some implementations, the computing device 300 includes a communication module 380 to facilitate external communication. In some implementations, the computing device 300 includes a sensing system 320 including various sensing system components including, for example one or more image sensors 322, one or more position/orientation sensor(s) 324 (including for example, an inertial measurement unit, accelerometer, gyroscope, magnetometer and the like), one or more audio sensors 326 that can detect audio input, and other such sensors. The computing device 300 can include more, or fewer, sensing devices and/or combinations of sensing devices.

In some implementations, the computing device 300 may include one or more image sensor(s), or camera(s) 360. The camera(s) 360 can include, for example, outward facing cameras, world facing cameras, and the like that can capture still and/or moving images of an environment outside of the computing device 300. In some implementations, the one or more camera(s) 360 may include a depth sensor. The still and/or moving images may be displayed by a display device of an output system 340 and/or transmitted externally via the communication module 380 and the network 306, and/or stored in a memory 330 of the computing device 300. The computing device 300 may include one or more processor(s) 350. The processors 350 may include various modules or engines configured to perform various functions. In some examples, the processor(s) 350 include object recognition module(s), feature recognition module(s), pattern recognition module(s), configuration identification modules(s), and other such processors. The processor(s) 350 may be formed in a substrate configured to execute one or more machine executable instructions or pieces of software, firmware, or a combination thereof. The processor(s) 350 can be semiconductor-based that include semiconductor material that can perform digital logic. The memory 330 may include any type of storage device that stores information in a format that can be read and/or executed by the processor(s) 350. The memory 330 may store applications and modules that, when executed by the processor(s) 350, perform certain operations. In some examples, the applications and modules may be stored in an external storage device and loaded into the memory 330.

Figure 4A:
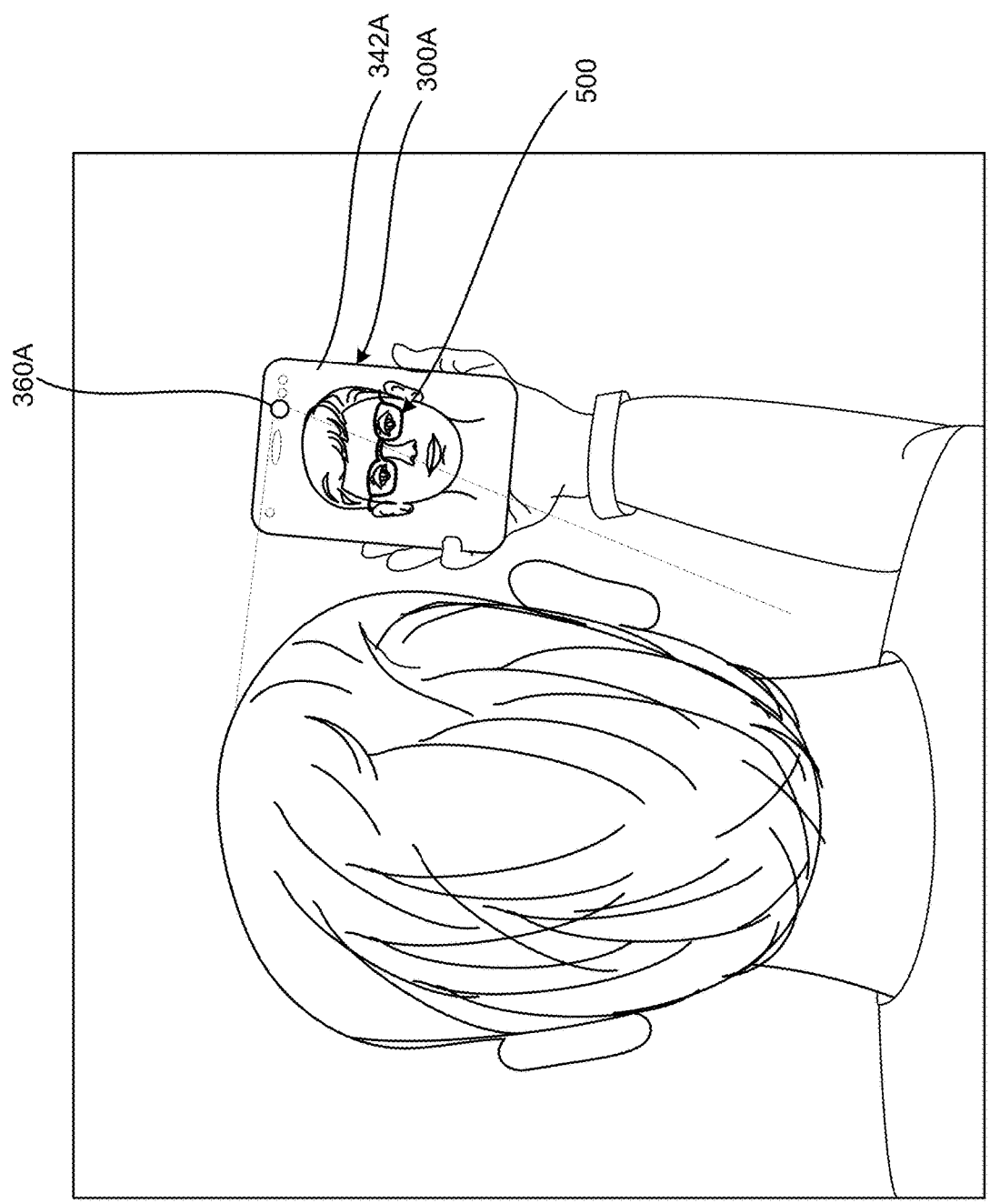
FIGS. 4A-4B illustrate image capture modes for determining display fit measurements and ophthalmic fit measurements, in accordance with implementations described herein.
Figure 4B:
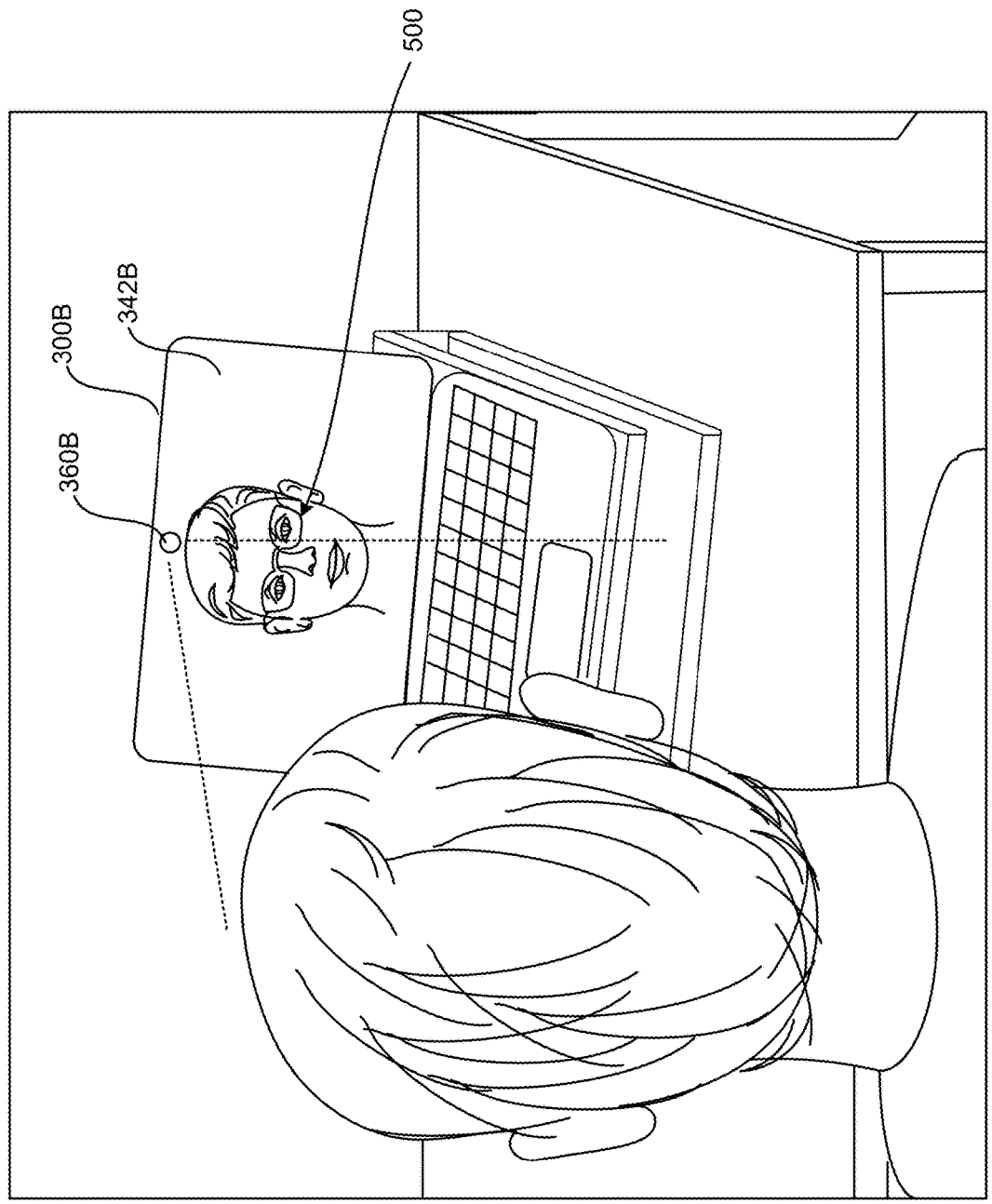

FIGS. 4A and 4B illustrate example computing devices, such as the computing device 300 described above with respect to FIG. 3, operated by a user to capture display fit measurements and/or ophthalmic fit measurements for a wearable computing device to be customized for use by the user. In FIG. 4A, the example computing device 300A is in the form of a handheld computing device, such as a smartphone. In FIG. 4B, the example computing device 300 is in the form of a laptop computing device 300B. FIGS. 4A and 4B provide two examples of computing devices 300 which may be used to capture image data for processing by a sizing simulator to carry out the systems and methods described herein. The principles to be described herein may be carried out by other types of computing devices, and in particular computing devices capable of executing applications thereon to make use of image capture capability, display capability, and external communication and processing to collect and process display fit measurements and/or ophthalmic measurements for customizing a wearable computing device for a particular user.

In the example shown in FIG. 4A, the user is holding the computing device 300A, so that the head and face of the user is in the field of view of a camera 360A of the computing device 300A, and the camera 360A can capture an image of the head and face of the user. The captured image may be displayed to the user on a display device 342A of the computing device 300A, so that the user can verify that his/her head and face are captured within the field of view of the camera 360A. Similarly, as shown in FIG. 4B, the computing device 300B is positioned relative to the user so that the head and face of the user are captured within the field of view of the camera 360B of the computing device 300B, and the camera 360B can capture an image of the head and face of the user. The captured image may be displayed to the user on a display device 342B of the computing device 300B, so that the user can verify that his/her head and face are captured within the field of view of the camera 360B. In the example arrangements shown in FIGS. 4A and 4B, image data captured by the camera 360 may be processed (for example, by recognition engine(s) and simulation engine(s) of external processor(s) as shown in FIG. 3) to detect wearable fit and/or display fit and/or ophthalmic fit measurements, and to determine for example, frame and/or lens sizing and contouring, display device configuration, and the like for the customization of a wearable computing device, such as, for example, the head mounted wearable computing device 100 shown in FIGS. 1B and 1C for the user.

In the example shown in FIGS. 4A and 4B, the user is wearing an example fitting frame 500. The fitting frame 500 is included in the image of the head and face of the user that is captured by the camera 360 of the computing device 300.

As described above, the detection of wearable fit and/or display fit and/or ophthalmic fit measurements from the captured image data may be facilitated by the detection of one or more physical features and/or attributes associated with the fitting frames worn by the user during the capture of image data. In some examples, the user may try on, or sample, a number of different fitting frames from a collection, or a kit of sample fitting frames. A fitting kit including the sample fitting frames may be provided to the user in advance of a fitting session. This may allow the user to assess at least some wearable fit parameters. For example, by trying on, or sampling a number of different fitting frames from of the fitting kit including the sample fitting frames, the user may assess factors such as, for example physical sizing, comfort, aesthetics and the like. The user may select a fitting frame from the fitting kit including the sample fitting frames for use during the fitting session. The sample fitting frames including in the fitting kit may mimic the size, shape, weight and the like of actual frames to be incorporated into the head mounted wearable computing device 100 based on the data captured during the fitting session, so as to provide the user with a relatively accurate fit and feel. Image data captured via the application running on the computing device 200 during the fitting session may be used to determine display fit and/or ophthalmic fit. Measurement data collected in this manner may be used to tailor the display device 104, and in particular, the image display area produced by the display device 104, for the user and the selected fitting frame based on the measurements detected from the image data. Measurement data collected in this manner may be used to incorporate corrective, or prescription lenses into the head mounted wearable computing device 100. Measurement data collected in this manner may be used to both configure the display device 104 for the user and the selected frames, and also incorporate corrective/prescription lenses into the head mounted wearable computing device 100.

Figure 5A:
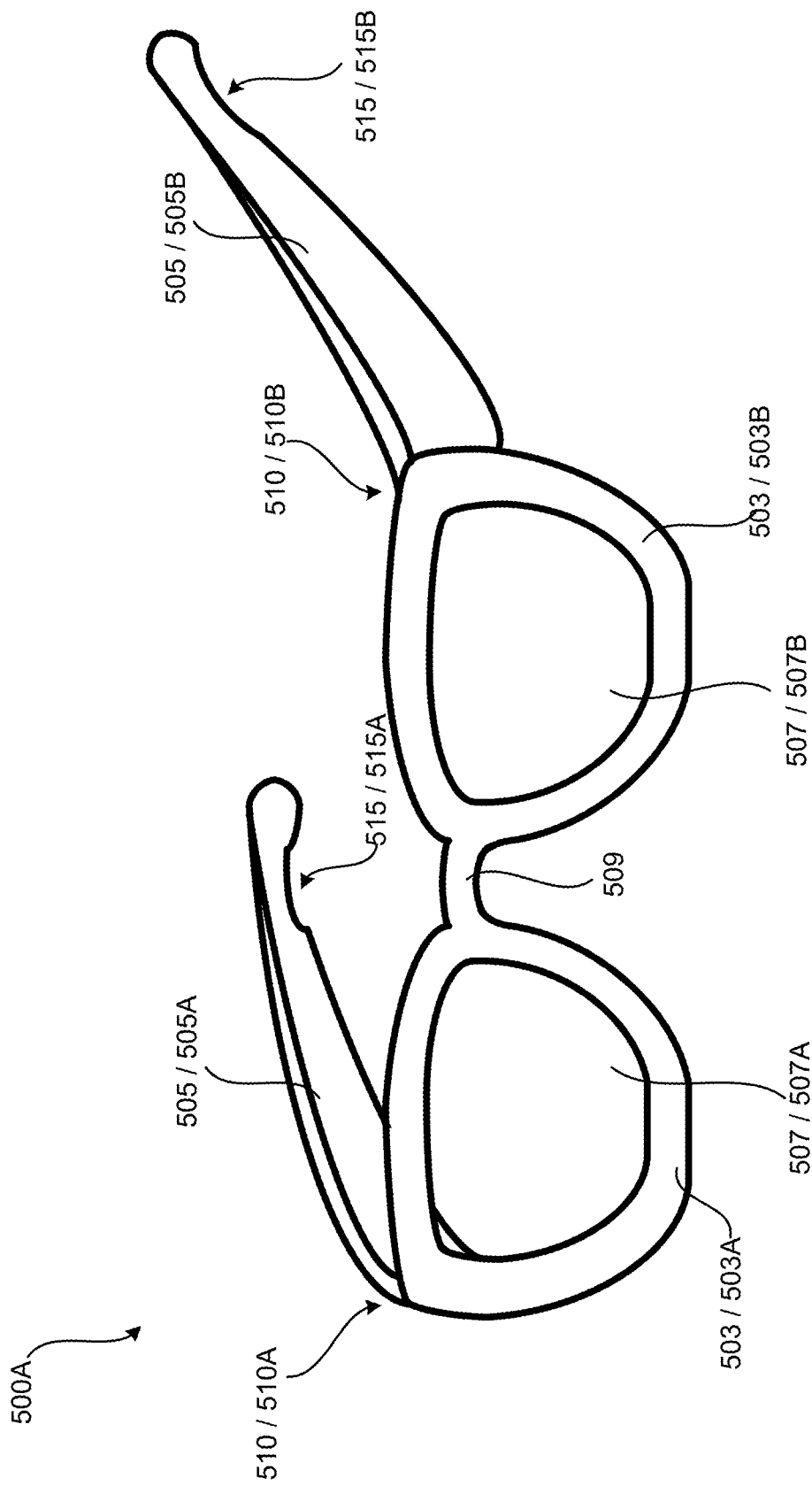
FIGS. 5A-5C are perspective views of example fitting frames, in accordance with implementations described herein.
Figure 5B:
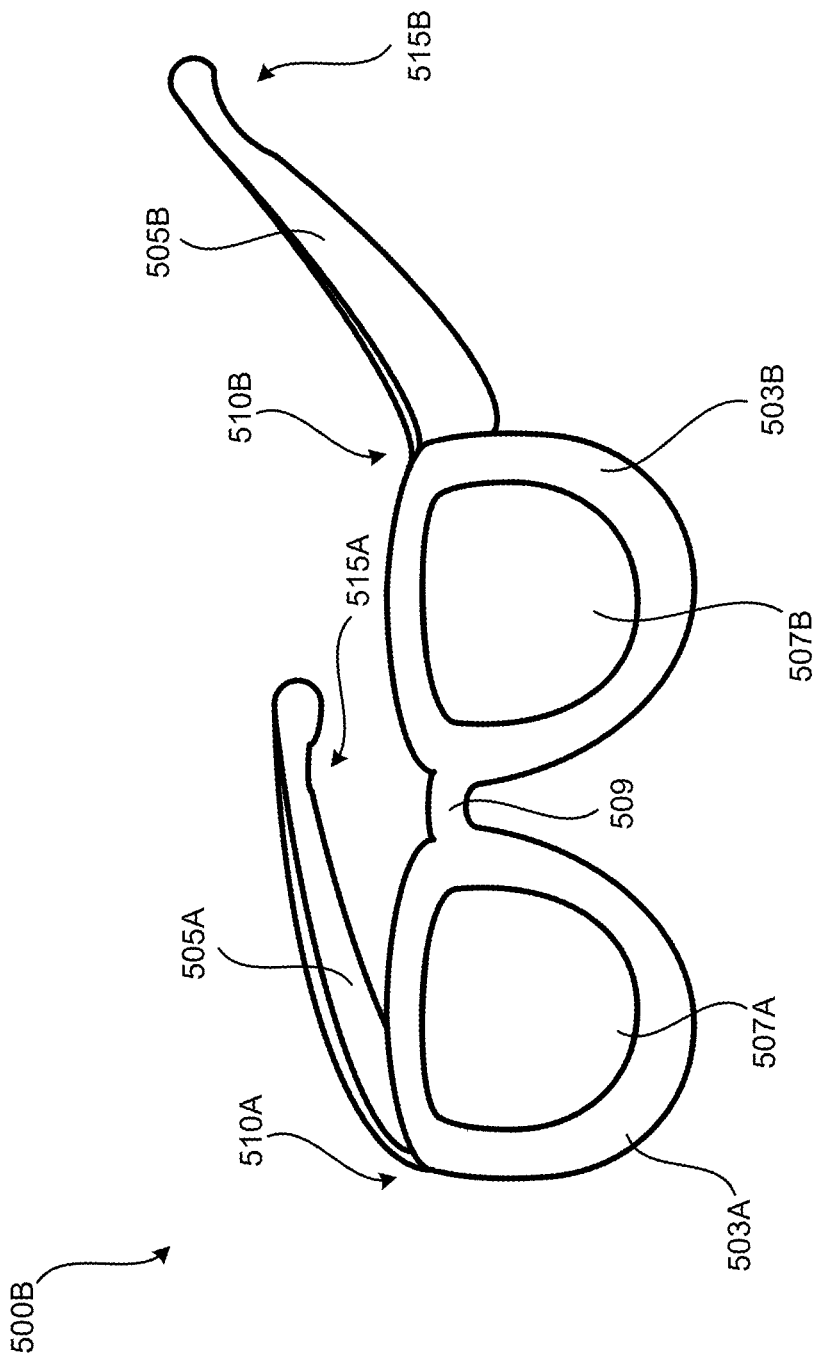
Figure 5C:
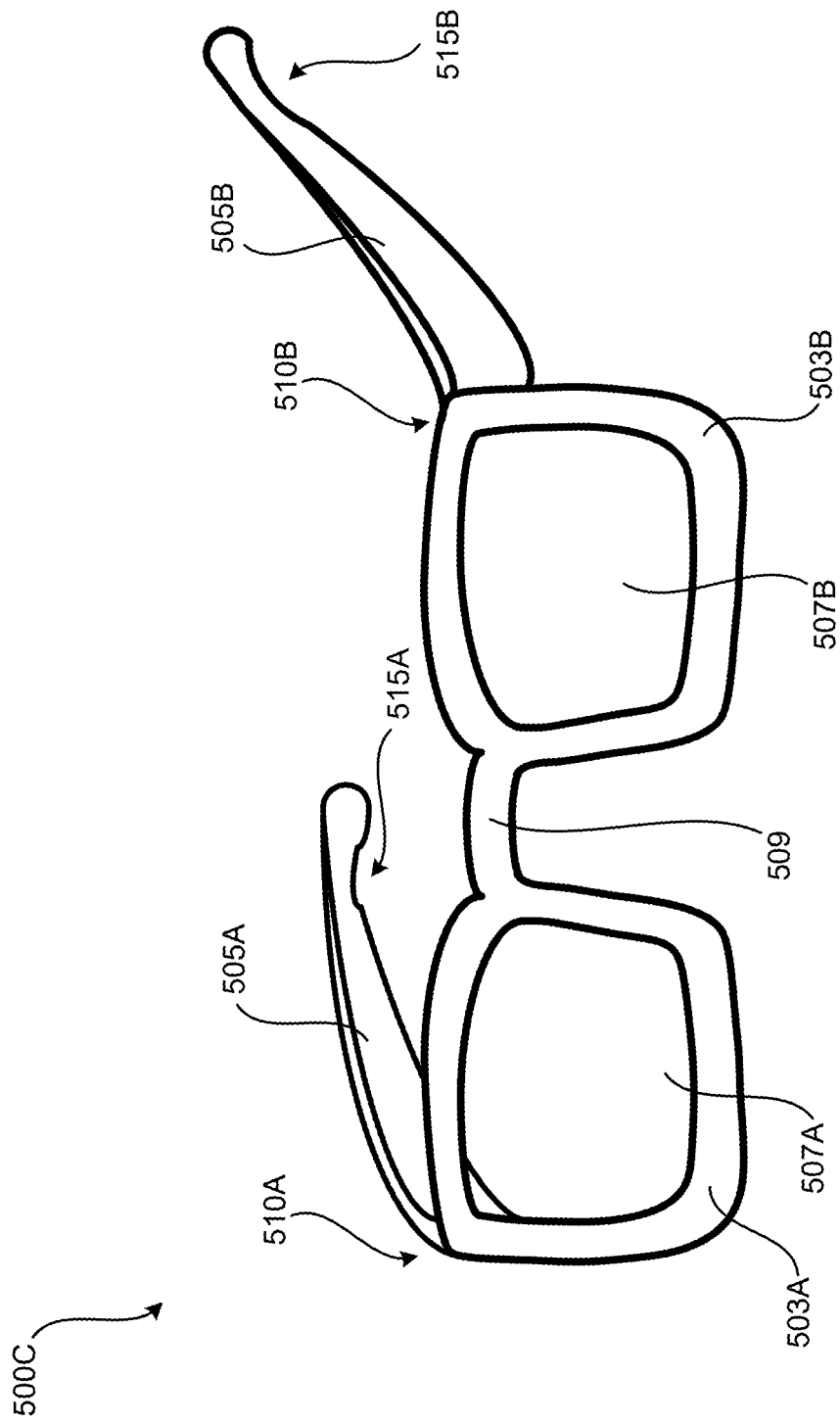

FIGS. 5A-5C illustrate example fitting frames 500, for example a first example fitting frame 500A, a second example fitting frame 500B, and a third example fitting frame 500C, for fitting a head mounted wearable computing device, in accordance with implementations described herein. The example fitting frames 500 may be physically, or geometrically representative of actual frames of a head mounted wearable computing device to be worn by a user, but simply for sizing/fitting purposes, and thus non-functional. The example fitting frames 500 shown in FIGS. 5A-5C are examples of sample fitting frames 500 that could be included in a fitting kit provided to the user for consideration in advance of the fitting session. The principles to be described herein are applicable to fitting frames having other shapes and/or sizes and/or configurations. The first example fitting frame 500A shown in FIG. 5A has a first size and/or shape and/or contour defined by a first set of physical features. The first example fitting frame 500A may be considered to be a medium sized frame having D-shaped rim portions 503A, 503B. The second example fitting frame 500B shown in FIG. 5B has a second size and/or shape and/or contour defined by a second set of physical features. The second example fitting frame 500B may be considered to be a medium sized frame having rounded rim portions 503A, 503B. The third example fitting frame 500C shown in FIG. 5C has a third size and/or shape and/or contour defined by a third set of physical features. The third example fitting frame 500C may be considered to be a large sized frame having rectangular rim portions 503A, 503B. The example fitting frames 500 (500A, 500B, 500C) shown in FIGS. 5A-5C are presented for purposes of discussion and illustration. The principles to be described herein may be applied to other fitting frames, having other sizes and/or shapes and/or contours defined by other physical features.

Figure 6A:
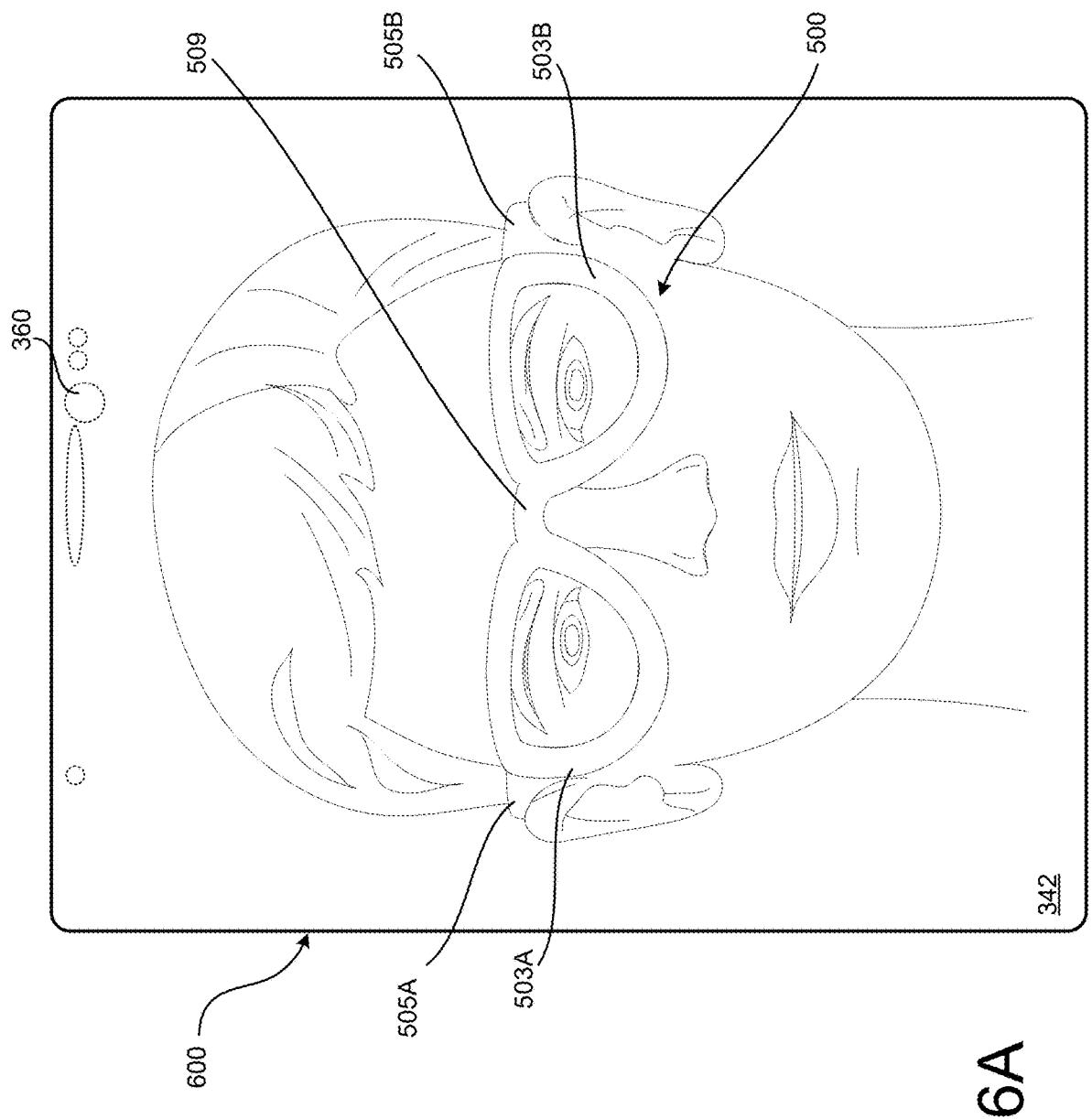
FIGS. 6A-6C illustrate an example frontal image of an example fitting frame worn by a user, and example features and/or keypoints and/or landmarks detected in the frontal image, in accordance with implementations described herein.

Each of the example fitting frames 500 (500A, 500B, 500C) shown in FIGS. 5A-5C includes a first rim portion 503A surrounding a first glass portion, or first lens 507A, and a second rim portion 503B surrounding a second glass portion, or second lens 507B. The first rim portion 503A/first lens 507A may be configured to be positioned to correspond to a first eye of the user, and the second rim portion 503B/first lens 507B may be configured to be positioned to correspond to a second eye of the user when the example fitting frame 500 (500A, 500B, 500C) is worn by the user. A bridge portion 509 may extend between inner end portions of the rim portions 503A, 503B to connect the rim portions 503A, 503B of the example fitting frame 500 (500A, 500B, 500C). The bridge portion 509 may be configured to rest on the nose of the user, to position the first rim portion 503A/first lens 507A to correspond to the first eye, and to position the second rim portion 503B/second lens 507B to correspond to the second eye. A first arm portion 505A may be coupled, for example pivotably or rotatably coupled to an outer end portion of the first rim portion 503A by a first hinge portion 510A. A second arm portion 505B may be coupled, for example pivotably or rotatably coupled to an outer end portion of the second rim portion 503B by a second hinge portion 510B. The first and second arm portions 505A, 505B may each include ear saddle portions 515A, 515B that are configured to rest on respective first and second ears of the user when the example fitting frame 500 (500A, 500B, 500C) is worn by the user As described above, a fitting frame in accordance with implementations described herein may include physical features or attributes that may be detected, or identified, or recognized in image data including the fitting frame as worn by the user. FIG. 6A illustrates an example two-dimensional image plane 600, or image 600, of a user wearing the example fitting frame 500. The example image 600 may be captured by the camera 360 of the computing device 300 operated by the user, through an application executed by the computing device 300. In the example shown in FIG. 6A, the image 600 is displayed on the display device 342 of the computing device 300. This may allow the user to visually verify that the captured image data includes capture of the fitting frame 500, facial and/or cranial and/or optical features of the user, and the like. In an example in which the computing device 300 is a handheld mobile computing device such as a smartphone, a self-portrait mode, or a selfie mode, may be invoked for the capture of image data by camera 360 of the computing device 300.

Figure 6B:
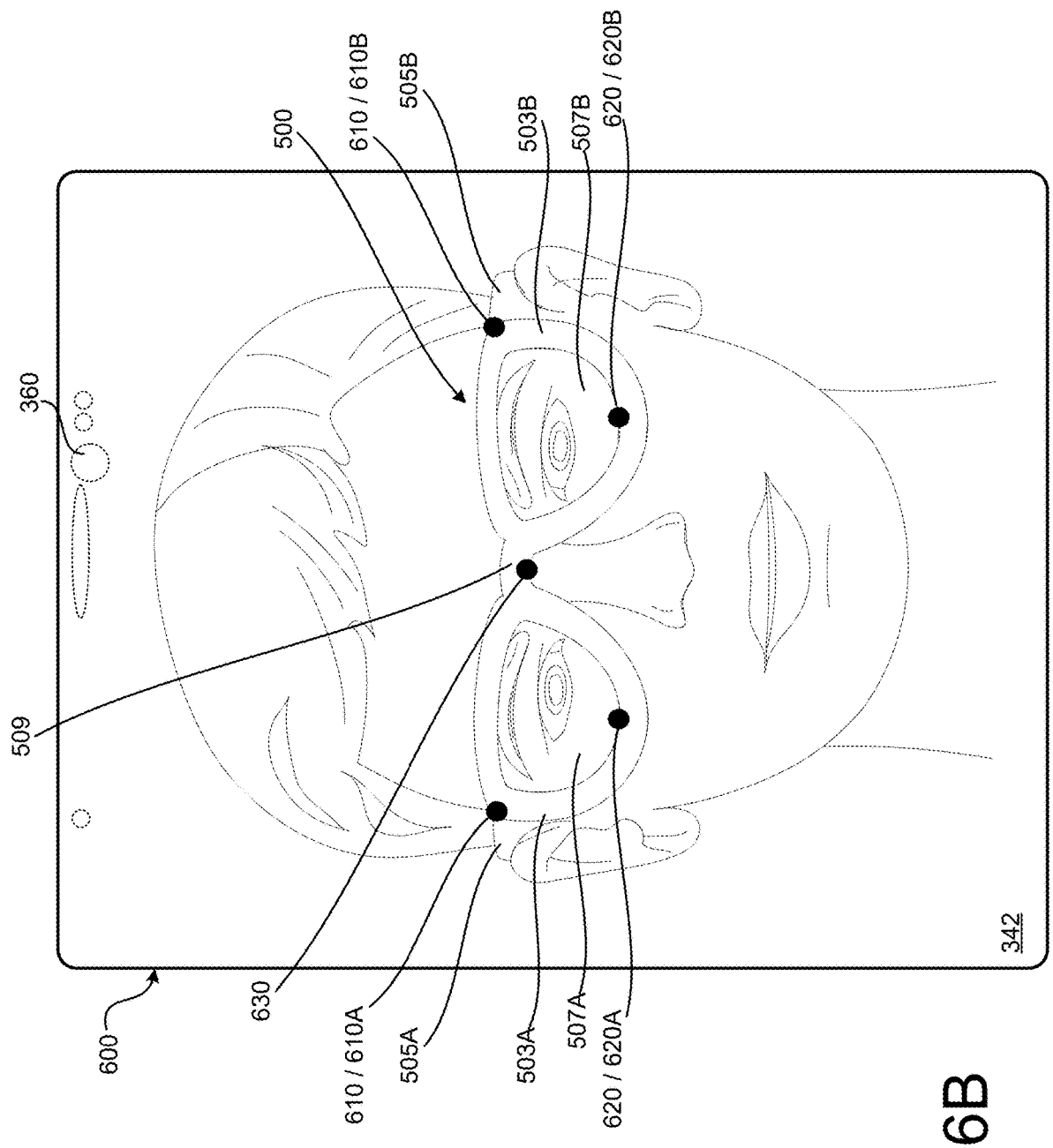

The image 600 may include a two-dimensional array of pixels captured by the camera 360. In some examples, features detected within the image 600 may correspond to positions, for example, two-dimensional coordinate positions, of the detected features within the image 600. FIG. 6B illustrates some examples of detectable keypoints, or detectable features, associated with the fitting frame 500 worn by the user while the image data is captured. Keypoints, or features, detected in the image data, may allow a three-dimensional pose of the fitting frame 500 on the face of the user to be determined, which may in turn be used to determine display fit information and/or ophthalmic fit information associated with the fitting frame 500 as worn by the user. Detection of these types of keypoints associated with the fitting frame 500 worn by the user in the image data are critical in the determination of the display fit and/or ophthalmic fit information that allows the head mounted wearable computing device 100 to be configured for the user.

The example arrangement shown in FIG. 6B includes an example keypoint 610A at a position in the image 600 corresponding to a hinged coupling point between the first rim portion 503A and the first arm portion 505A of the fitting frame 500, for example, a position corresponding to the first hinge portion 510A pivotably coupling the rim portion 503A and the first arm portion 505A. The example arrangement shown in FIG. 6B includes an example keypoint 610B at a position in the image 600 corresponding to a hinged coupling point between the second rim portion 503B and the second arm portion 505B of the fitting frame 500. The example arrangement shown in FIG. 6B includes an example keypoint 620A at a position corresponding to a bottom peripheral edge portion of the first lens 507A of the fitting frame 500, and an example keypoint 620B at a position corresponding to a bottom peripheral edge portion of the second lens 507B of the fitting frame 500. The example keypoints 620A, 620B are simply example keypoints corresponding to a particular peripheral edge portion of the lenses 507. Keypoints can also and/or instead be defined at other peripheral edge portion(s) of the lenses 507 such as, for example, a top peripheral edge portion, a left peripheral edge portion and/or a right peripheral edge portion of the lenses 507. In some examples, keypoint(s) defined along the peripheral edge portion of the lenses 507 may correspond to designated section(s) of the lenses 507. In some examples, keypoint(s) defined along the peripheral edge portion of the lenses 507 may correspond to a particular point along the peripheral edge of the lenses 507. The example arrangement shown in FIG. 6B includes an example keypoint 630 at a position in the image 600 corresponding to the bridge portion 509 of the fitting frame 500.

The example image 600 shown in FIGS. 6A and 6B is a substantially frontal image, and the example keypoints 610, 620, 630, or features 610, 620, 630 are just some examples of detectable keypoints, or features, associated with the fitting frame 500 worn by the user that may be detected in the image 600 to in turn detect display fit and/or ophthalmic fit associated with the fitting frame 500 for the user. Other keypoints, or features, associated with the fitting frame 500 may be detected in the image 600 to facilitate the determination of display fit and/or ophthalmic fit. Examples of other detectable keypoints, or detectable features may include, for example, a top portion of the lenses 507, inner peripheral portions of the lenses 507 (i.e., portions of the lenses 507 adjacent to the bridge portion 509 of the fitting frame 500), outer peripheral portions of the lenses 507 (i.e., portions of the lenses 507 adjacent to the hinge portions 510 of the fitting frame 500), and the like. Distribution of the detectable keypoints, or features, across the fitting frame 500, and separation of the keypoints, or features, may improve detection accuracy and correlation with the three-dimensional model. Additionally, other keypoints, or features associated with the fitting frame 500 may be detected in a profile image of the user, or an image that is captured at an angle with respect to the user, which may include portions of the arm portion(s) 505 of the fitting frame 500, position of the ear saddle point(s) 515 with respect to the ear of the user, position of the rim portion(s) 503 with respect to the face of the user, and the like. More, or fewer, keypoints and/or combinations of keypoints associated with the fitting frame 500 may be detected in the image 600 to determine display fit and/or ophthalmic fit of the fitting frame 500 for the user. As noted above, detection of specific keypoints associated with the fitting frame 500 worn by the user in the image data are critical in the determination of the display fit and/or ophthalmic fit information that allows the head mounted wearable computing device 100 to be configured for the user.

Figure 6C:
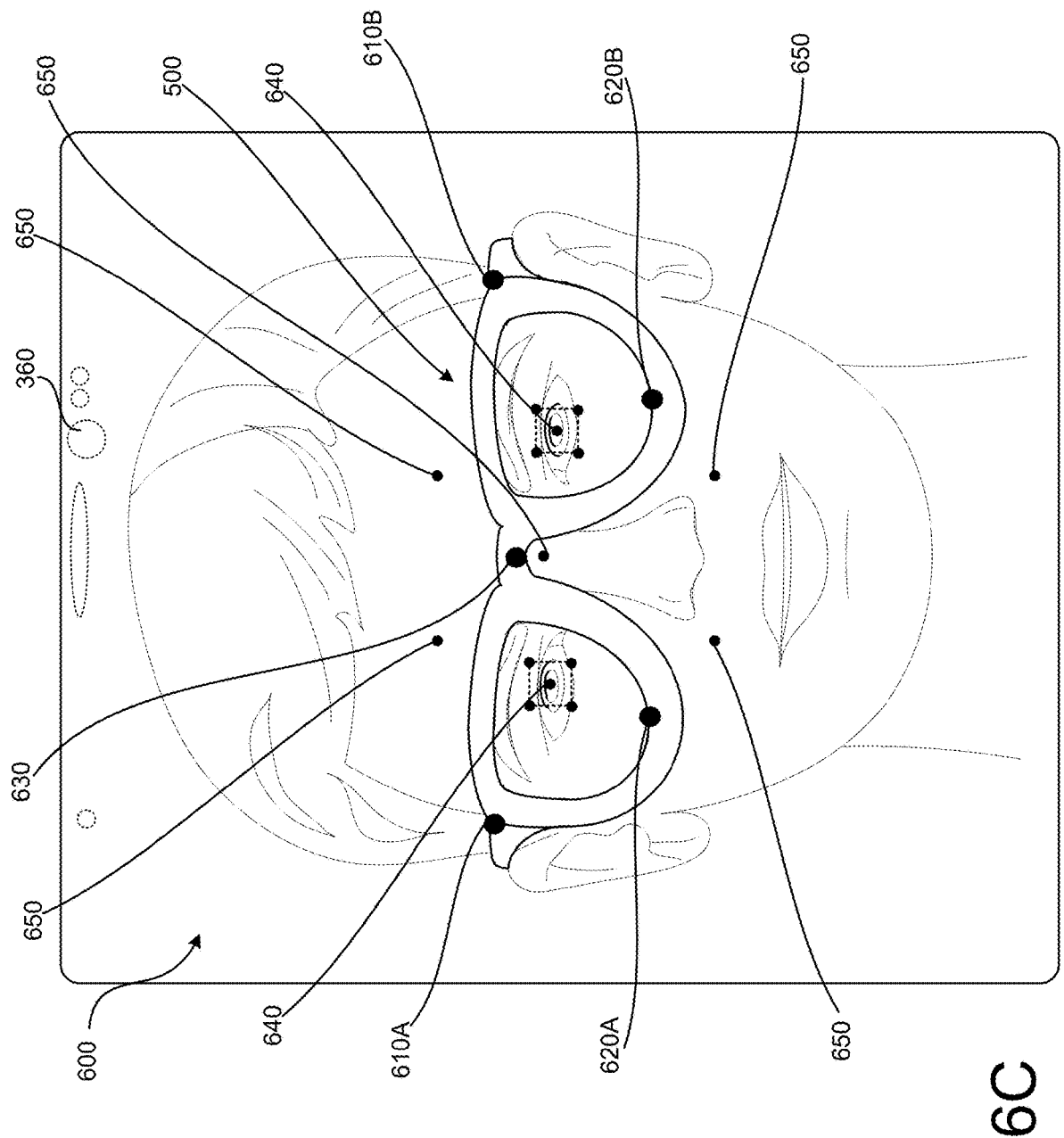

FIG. 6C illustrates a plurality of facial landmarks (together with the example detectable keypoints 610, 620, 630, or features 610, 620, 630 described above with respect to FIG. 6B) which may be detected in the two-dimensional image 600 captured by the camera 360 of the computing device 300. In some examples, pupils, and in particular a pupil center 640 for each eye of the user, may be detected in the image 600. In some examples, other facial landmarks 650 may be detected in the image 600. In the example shown in FIG. 6C, some example facial landmarks 650 include the bridge of the nose, a quadrant surrounding the bridge of the nose at the temple and cheeks, simply for purposes of discussion and illustration. Other facial landmarks may be detected to facilitate the identification of features related to positioning of the fitting frame 500 on the head/face of the user. The facial landmarks 650 may provide, for example, indexing for positioning of the fitting frame 500 relative to the user's head/face, and the like.

Figure 6D:
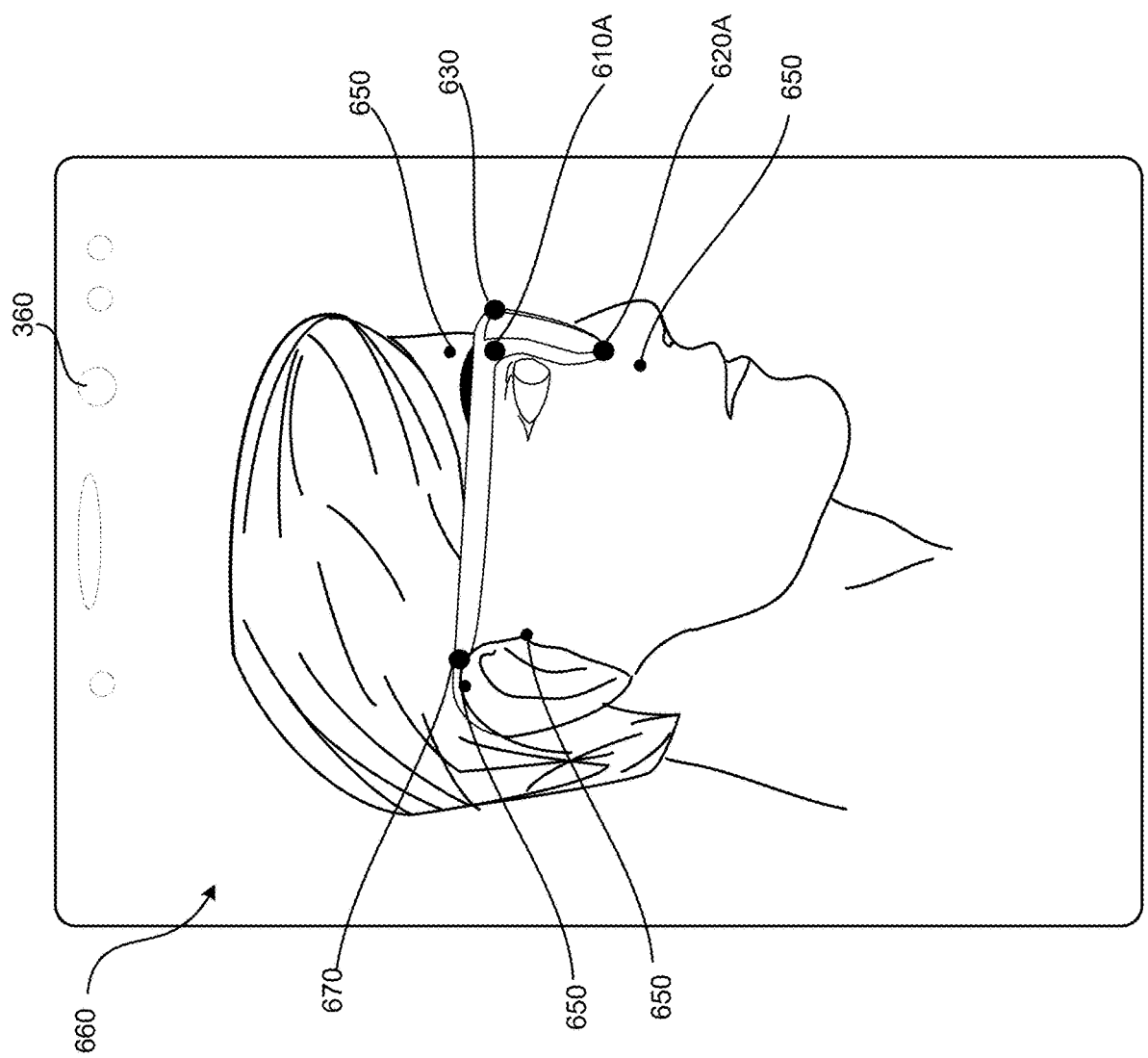
FIG. 6D illustrates an example profile image of an example fitting frame worn by a user, and example features and/or keypoints and/or landmarks detected in the profile image, in accordance with implementations described herein.

In some implementations, a side, or profile image 660 may be captured, as shown in FIG. 6D. The example image 660 shown in FIG. 6D is a substantially full profile image 660, simply for purposes of discussion and illustration. The information detected from the profile image 660 may be detected from side images that are taken at less than 90 degrees from the frontal image 600 shown in FIGS. 6A-6C. As shown in FIG. 6D, additional keypoints, or features associated with the fitting frames, and additional facial/cranial landmarks, may be detected in the side, or profile image 660. In the example shown in FIG. 6D, a keypoint 670 may be detected at a position in the image 660 corresponding to the ear saddle portion 515A of the arm portion 505A of the fitting frame 500. Facial/cranial landmarks 650 may be detected, for example, at portions of the ear of the user, for example, a front crease portion of the ear, a top portion of the ear, and the like. Other keypoints and/or facial/cranial features may also be detected from the side/profile image 660. Similarly, a tilt, or angle (for example, pantoscopic angle PA) of the fitting frame 500, for example, relative to the face of the user, may be detected from a side, or profile image 660. That is, while an angle between the rim portion 503 and the arm portion 505 of the fitting frame 500 may be known, the tilt or angle of the fitting frame 500 will vary based on numerous factors. These factors may include, for example, how the user wears the fitting frame 500 (closer to/further from the eyes, higher/lower on the nose, etc.), the positioning of the ears relative to the nose of the user, and other such factors.

In some implementations, detected keypoints associated with the fitting frame 500 (such as the detected example keypoints 610, 620, 630, 670 or features 610, 620, 630, 670 shown in FIGS. 6B-6D), alone and/or together with detected facial/cranial features of the user (such as the detected pupil center 640 and facial landmarks 650 shown in FIGS. 6C and 6D) may be used to determine a pose, for example, a three-dimensional pose of the fitting frame 500 on the face of the user. This three-dimensional pose of the fitting frame 500 on the face of the user may be used to determine display fit and/or ophthalmic fit for the head mounted wearable computing device 100, for example in the form of smart glasses. In some examples, a configuration of the frame 102 of the head mounted wearable computing device 100 to be configured corresponds to a configuration of the fitting frame 500 worn by the user in the image 600. In some examples, a configuration of the frame 102 of the head mounted wearable computing device 100 to be configured does not necessarily correspond to the configuration of the fitting frame 500.

In some examples, data extracted from, for example, the two-dimensional frontal image 600 and the corresponding detected three-dimensional pose of the fitting frame 500 on the face of the user may be synthesized to assess gazability of the fitting frame 500 for the user. That is, this data may by synthesized to determine a configuration of the display device 104 included in the head mounted wearable computing device 100 may allow the display device 104 to be configured such that content output by the display device 104 is within a field of view of the user wearing the head mounted wearable computing device 100. For example, the display device 104 may be configured such that content output by the display device 104 and displayed at the output coupler 144 is captured within the field of view of the user and is visible to the user.

As noted above, three-dimensional pose information related to the pupils (for example, the pupil center(s) 640) and the face of the user (for example, the detected facial landmark(s) 650), together with the three-dimensional pose information of the fitting frame 500, may allow for the determination of lens related measurements (for example, pupil height, vertex distance, pantoscopic angle and the like). As noted above, the three-dimensional position and orientation, or pose, of the fitting frame 500 may be determined based on detection and/or identification of the one or more keypoints 610, 620, 630, or features 610, 620, 630 in the image data captured by the camera 360 of the computing device 300 operated by the user. In some examples, additional information may be obtained from the side, or profile image 660 as described above with respect to FIG. 6D. Although there may be some flex in the fitting frame 500, in some examples the fitting frame 500 may be considered to be a substantially rigid body with three degrees of movement. Thus, a relatively precise detection of at least one known point on the fitting frame 500 may be used to determine the three-dimensional position of the fitting frame 500. One or more of the keypoints 610, 620, 630, or features 610, 620, 630 may be reliably detectable in the image 600, and a position of the detected one or more keypoints 610, 620, 630, or features 610, 620, 630 is known in the three-dimensional space associated with the fitting frame 500.

As noted above, systems and methods, in accordance with implementations described herein, may facilitate the fitting of a head mounted wearable computing device based on image data captured via an application running on a computing device operated by a user. The image data may be captured by the user and the wearable computing device may be fitted and configured for the user in a self-directed, or unsupervised, or unproctored manner, without requiring access to a retail establishment and/or an in-person or virtual appointment with a sales agent. The capture and processing of the image data will be described in more detail below.

A user wanting to select, fit and configure a head mounted wearable computing device 100 as described above may have access to, or be provided, one or more fitting frames, or a sample set of fitting frames, for consideration in advance of the fitting process. In some examples, the user may try on each fitting frame included in the sample set of fitting frames, to assess factors such as size, comfort, appearance, compatibility with facial features, overall wearability, and the like associated with each. The user may select a fitting frame 500 from the sample set of fitting frames based on these and/or other factors, to use going forward in the fitting and configuration process.

In some examples, the sample set of fitting frames to be tried on and/or assessed may be selected by the user from a plurality of fitting frames available for try on. In some examples, the system (for example, from within a module of the application executing on computing device 300 operated by the user) may suggest the sample set of fitting frames to the user, based on an analysis of physical features of the user and shapes and/or sizes and/or configurations of frames which may be compatible with the detected physical features. In some examples, the sample set of fitting frames may be provided to the user in advance of initiating the process for the fitting and configuring of the head mounted wearable computing device 100.

The ability to physically try on one or more pairs of fitting frames 500 provides the user with the opportunity to physically assess fit, to make a determination of which of the fitting frames 500 is/are physically most comfortable, properly/comfortably align with facial and/or cranial features (eyes, nose bridge, ear saddle points, cheek contact points, etc.) and the like. This assessment of wearable fit by the user, making use of physical fitting frames 500 prior to fitting and configuration of the head mounted wearable computing device 100, may yield a head mounted wearable computing device 100 that is more suited to the particular user. The selection of a fitting frame 500 in this manner, based on physical wearable fit by the user, may yield a more accurate fitting and configuration of the head mounted wearable computing device 100 for the user.

In some situations, it may be that a single fitting frame 500 is available to the user for the fitting and configuration of the head mounted wearable computing device 100. In this situation, the fitting and configuration process may be carried out as to be described below, with additional measures taken for the determination of wearable fit of a particular frame 102 for incorporation into the head mounted wearable computing device 100.

In some examples, the user may operate the computing device 300 (as in, for example, FIGS. 4A and/or 4B) to launch the application and initiate the fitting and configuration of the head mounted wearable computing device 100 using the selected fitting frame 500 (for example, as selected from the sample set of fitting frames as described above). In some examples, the application executing on the computing device 300 operated by the user may prompt the user to initiate image capture while wearing the selected fitting frame 500. Hereinafter, this process will be described based on the capture of a frontal image 600, as described above with respect to FIGS. 6A-6C, simply for ease of discussion and illustration. However, in some implementations, data detected in profile images 660 as shown in FIG. 6D, and/or semi-profile images may be used in the fitting and configuration of a head mounted display device 100 for the user.

In some examples, the application may prompt the user to confirm the selection of a particular fitting frame 500 to be worn by the user during the capture of image data. Thus, in some situations, configuration information related to the selected fitting frame 500 to be worn during the image capture may be known. This may include, for example, linear and/or angular measurements and/or contours associated with the selected fitting frame 500, a two-dimensional model and/or a three-dimensional model of the selected fitting frame 500, and other such information. This known information associated with the selected fitting frame 500 may be accessible to the application executing on the computing device 300. For example, this known configuration information may be stored in a database accessible to the application executing on the computing device 300. Known configuration information associated with the selected fitting frame may further enhance the accuracy and efficiency of the fitting and configuration of the head mounted wearable computing device 100 for the user.

Figure 7:
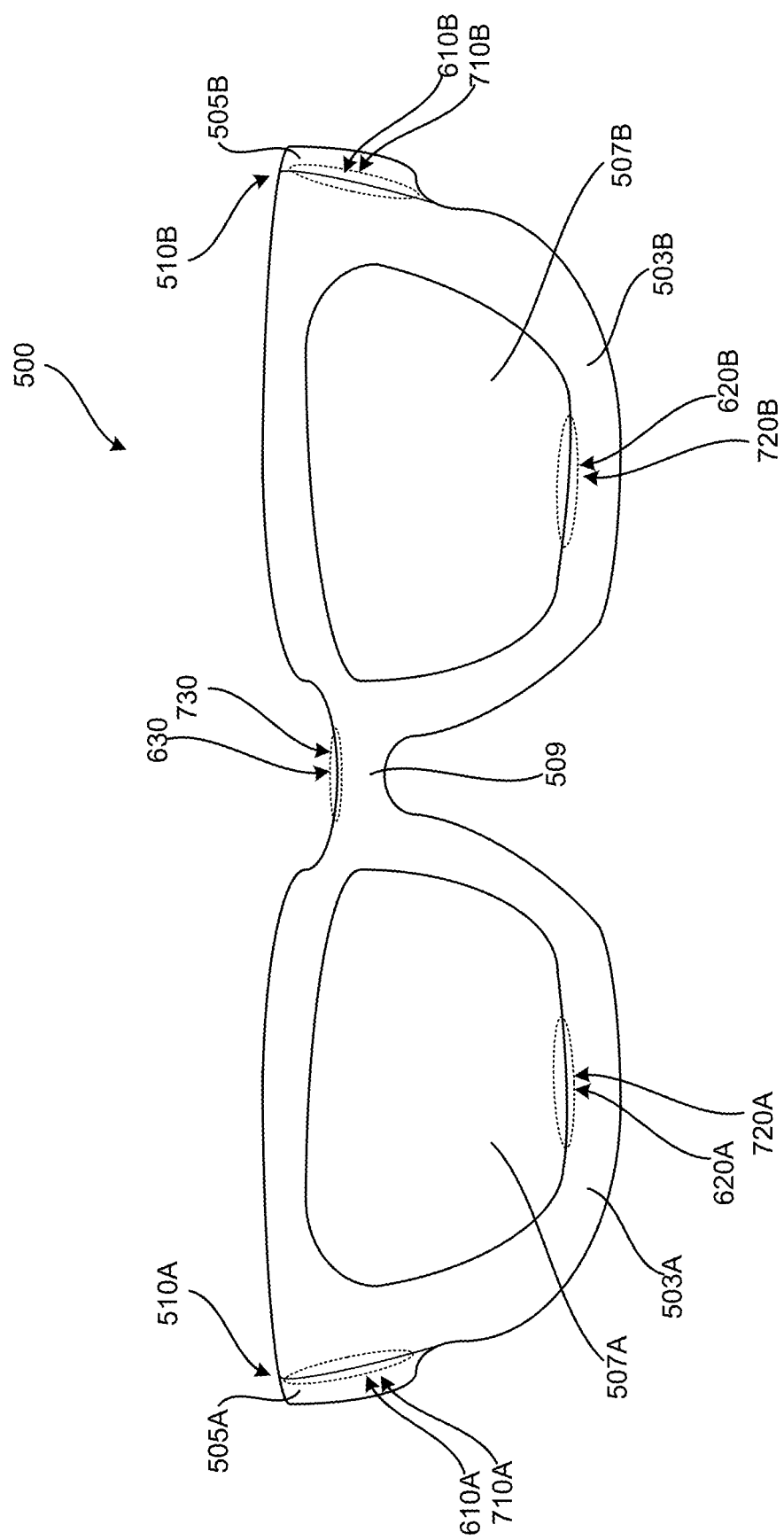
FIG. 7 is a front view of an example fitting frame, in accordance with implementations described herein.

As shown in FIG. 7 and as described above, various keypoints, or features, associated with the fitting frame 500 can be detected within the frontal image 600 captured by the camera 360 of the computing device 300 operated by the user. In the example arrangement shown in FIG. 7, a first keypoint 610A is located at a first known position 710A on the fitting frame 500, corresponding to a hinged coupling point 510A between the first rim portion 503A and the first arm portion 505A of the fitting frame 500. Similarly, a second keypoint 610B is located at a second known position 710B on the fitting frame 500, corresponding to a hinged coupling point 510B between the second rim portion 503B and the second arm portion 505B of the fitting frame 500. A third keypoint 620A is located at a third known position 720A on the fitting frame 500, corresponding to a bottom peripheral edge portion of the first lens 507A, and a fourth keypoint 620 is located at a fourth know position 720B on the fitting frame 500, at a position corresponding to a bottom peripheral edge portion of the second lens 507B. A fifth keypoint 630 is located at a fifth known position 730 on the fitting frame 500, at a position corresponding to a central portion of the bridge portion 509 of the fitting frame 500. Detection of the keypoints 610, 620, 630 and identification of the corresponding known positions 710, 720, 730 on the fitting frame 500 may provide fixed points of reference on the fitting frame 500 that may be used to detect and/or to refine the three-dimensional pose of the fitting frame 500 on the face of the user. Detected features or attributes associated with each of the detected keypoints 610, 620, 630 can be compared to known features or attributes (known position, geometry, contour, distance and the like) to determine depth, for example with respect to the camera 360. This may facilitate the determination of the three-dimensional pose of the fitting frame 500 on the face of the user.

For example, the detected keypoints 610, 620, 630 and the corresponding known positions 710, 720, 730 on the fitting frame 500 may be matched to the corresponding set of points/positions on the three-dimensional model of the fitting frame 500. As noted above, the three-dimensional model of the fitting frame 500 may be previously stored and accessible via the application executing on the computing device 300. Thus, a known set of correspondences between the three-dimensional model of the fitting frame 500 and the corresponding points detected in the image 600 may be used to determine the three-dimensional pose of the fitting frame 500.

In some implementations, detected facial/cranial landmarks, such as the example landmarks 650 shown in FIGS. 6A-6D, may facilitate the detection and identification of the keypoints, or features of the fitting frame 500. For example, detection and identification of the bottom peripheral edge portion of the first lens 507 defining the example keypoint 620A described above may be compacted or refined, and/or accuracy may be increased, based on detection beneath the keypoint 620A of a landmark 650 defining the cheek of the user, a landmark 650 to the right of keypoint 620A defining the bridge of the nose of the user, and the like. Other keypoints defined at other peripheral edge portions of the lenses 507 (i.e., top and/or left and/or right peripheral edge portions of the lenses 507) may be compacted and/or refined based on detection of other landmarks 650 in a similar manner.

In some implementations, the detection of keypoints, or features, associated with the fitting frame 500 worn by the user in the image 600 may rely on comparison against a database populated with synthetic data, actual data, and a combination of synthetic data and actual data. Synthetic data may include, for example three-dimensional renderings of glasses and three-dimensional renderings of heads, in different combinations of poses, lighting conditions and the like, that may be combined to produce exceptionally large numbers of different rendered combinations of glasses worn on heads in various conditions. Actual data may include, for example, image data capturing actual people wearing glasses. The synthetic data and the actual data may be combined to produce additional combinations of glasses on heads, in different poses, conditions and the like. This data (the synthetic data, the actual data, and the combined data) may be amassed to train a neural network that can then output continuously improving results in the matching of keypoints on the fitting frames to points in the three-dimensional models.

In some situations, a well developed/densely populated neural network may be available for a particular fitting frame 500, including training data representing a relatively large number of poses and positions and angles of the fitting frame 500. In this situation, an image, for example, the frontal image 600 described above with respect to FIGS. 6A-6C, may be fed into the neural network established for that fitting frame 500, and a correspondence between the image 600 of the user wearing the fitting frame 500 and the data populating the neural network can be detected, without necessarily requiring the detection of keypoints in the image 600 prior to the processing of the image 600 by the neural network.

In some implementations, a process similar to the fitting and configuration process may be applied to the calibration, or recalibration, of the head mounted wearable computing device 100 after the head mounted wearable computing device 100 has been delivered to the user. For example, a new product setup process for the head mounted wearable computing device 100 that has been configured for the user may include a fine tuning of the display characteristics once the head mounted wearable computing device 100 has been delivered. For example, an application executing on the computing device 300 operated by the user may prompt the user to capture image data including the user wearing the head mounted wearable computing device 100. Detection of keypoints on the head mounted wearable computing device 100 may be detected to determine the three-dimensional pose of the head mounted wearable computing device 100 on the face of the user, and relative to the user's eyes/eye box. Control software controlling operation of the display device 104 may adjust an output of content to, for example, optimize where the content is displayed. This may optimize gazability, and improve the user viewing experience.

The measurements, or parameters described above may be collected to determine display fit characteristics for a user wearing a selected fitting frame 500. The measurements, or parameters described above may allow for fitting of the display device of the head mounted wearable computing device (such as the display device 104 of the head mounted wearable computing device 100 shown in FIGS. 1B and 1C) such that the pupil of the user will be as centrally aligned as possible within the eye box 140, so that the user eye gaze passes through the output coupler 144, where displayed content is visible to the user on the lens 107. The measurements, or parameters described above may allow for configuration of the display device 104 of the head mounted wearable computing device 100, such that the display of content is visible to the user within a relatively large portion of the field of view of the user.

Systems and methods, in accordance with implementations described herein, may provide for the collection of measurements to determine ophthalmic fit characteristics for a user wearing the selected fitting frame 500. In some implementations, the systems and methods may provide for the collection of measurements to determine both display fit characteristics and ophthalmic fit characteristics. As described above with respect to FIGS. 2A-2D, ophthalmic measurements may be detected within the image data captured by the camera 360 of the computing device 300 operated by the user. These measurements, including, for example, pupil height, interpupillary distance, monocular pupil distance, pantoscopic angle, vertex distance, and other such parameters, or measures, may be detected within the image data and processed for the incorporation of corrective, or prescription lenses into the head mounted wearable computing device 100. In some examples, these ophthalmic measurements are used in coordination with the display fit measurements described above to provide both a proper display fit for a particular user, together with the corrective/prescription lens needs of the user.

Figure 8:
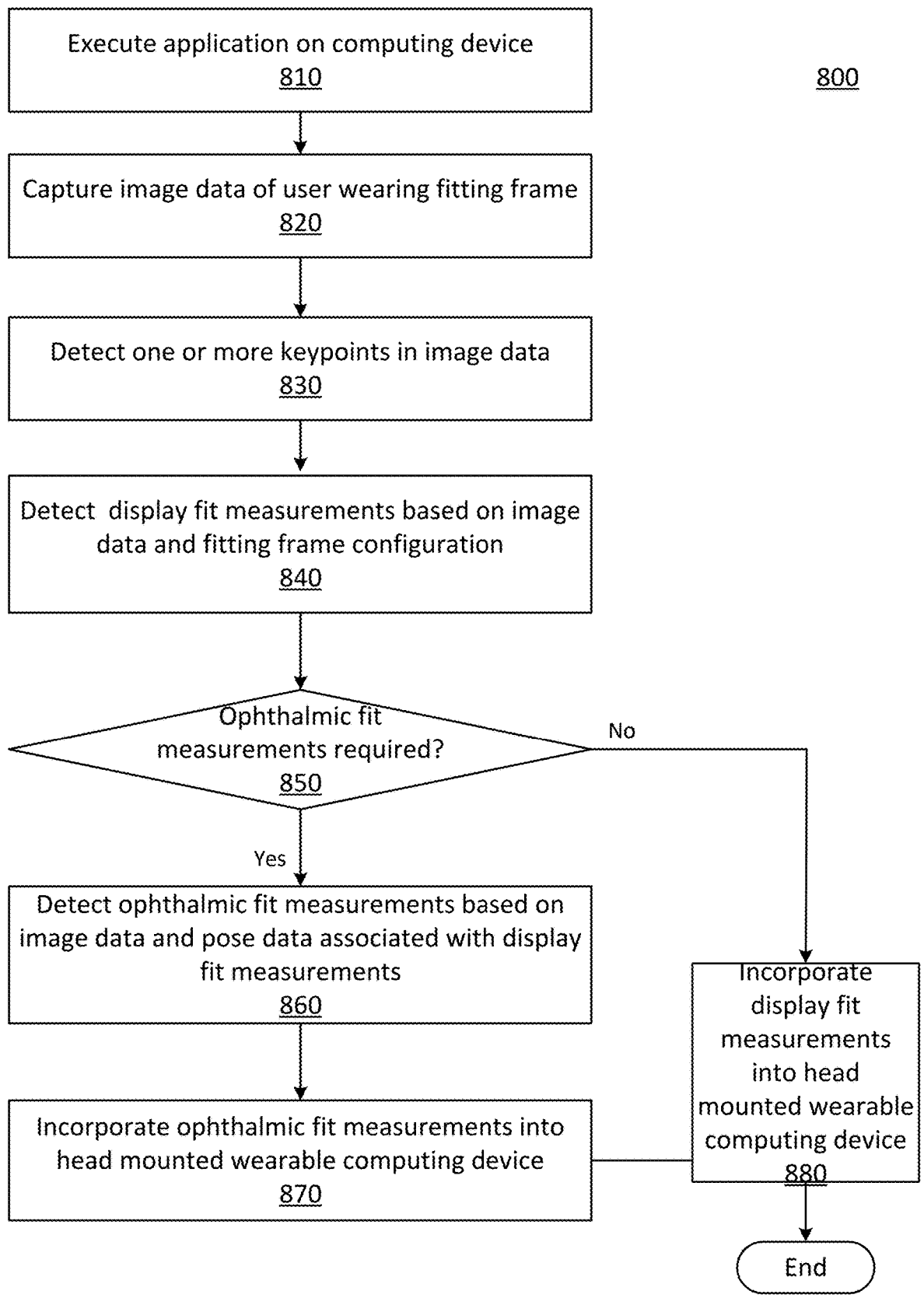
FIG. 8 is a flowchart of an example method, in accordance with implementations described herein.

FIG. 8 is a flowchart of an example method 800 of operating a computing system to configure a head mounted wearable computing device including a display for a user. A user operating a computing device (such as, for example, the computing device 300 described above) may cause the computing device to execute an application. The application may provide for detection of display fit measurements and/or ophthalmic fit measurements from image data captured by the computing device (block 810). A camera (such as, for example, the camera 360 of the computing device 300 described above) is operated to capture image data of a user wearing a fitting frame (block 820). The fitting frame may be selected from one or more sample fitting frames available to the user (such as, for example, the fitting frames 500 described above with respect to FIGS. 5A-7). The system may detect one or more keypoints, or features on the fitting frame (such as, for example, the keypoints 610, 620, 630 and/or 670, the facial/cranial landmarks 640, 650 described above, and the like) (block 830).

In some examples, analysis of the image capture data for detection of the keypoints and/or features and/or landmarks may be performed by the computing device, for example, the object recognition module and/or the pattern recognition module of the processor 350 of the computing device described above. In some examples, the detection of the keypoints and/or features and/or landmarks may be performed by an external device, such as, for example, an object recognition module and/or a pattern recognition module of the server included in the external resources 302 in communication with the computing device 300 as described above.

Display fit measurements including a three-dimensional pose of the fitting frame may be determined based on the positions of the detected keypoints and/or features and/or landmarks relative to a configuration of the fitting frame (block 840). Ophthalmic fit measurements, if required (block 850), may be detected from the image data, and from display fit measurements, for a user requiring corrective/prescription lenses to be incorporated into the head mounted wearable computing device (blocks 860, 870 and 880). In some examples, the analysis for determining the display fit measurements and/or the ophthalmic fit measurements may be performed by the computing device (such as, for example, the configuration identification module of the processor 350 of the computing device 300 described above). In some examples, the analysis for determining the display fit measurements and/or the ophthalmic fit measurements may be performed by an external computing device (such as a configuration identification module of the server included in the external resources 302 in communication with the computing device 300 described above). The ophthalmic fit measurements and the display fit measurements may be incorporated into the head mounted wearable computing device for the user, to provide a viewing experience that is tailored for the optical needs of the user.

Figure 9:
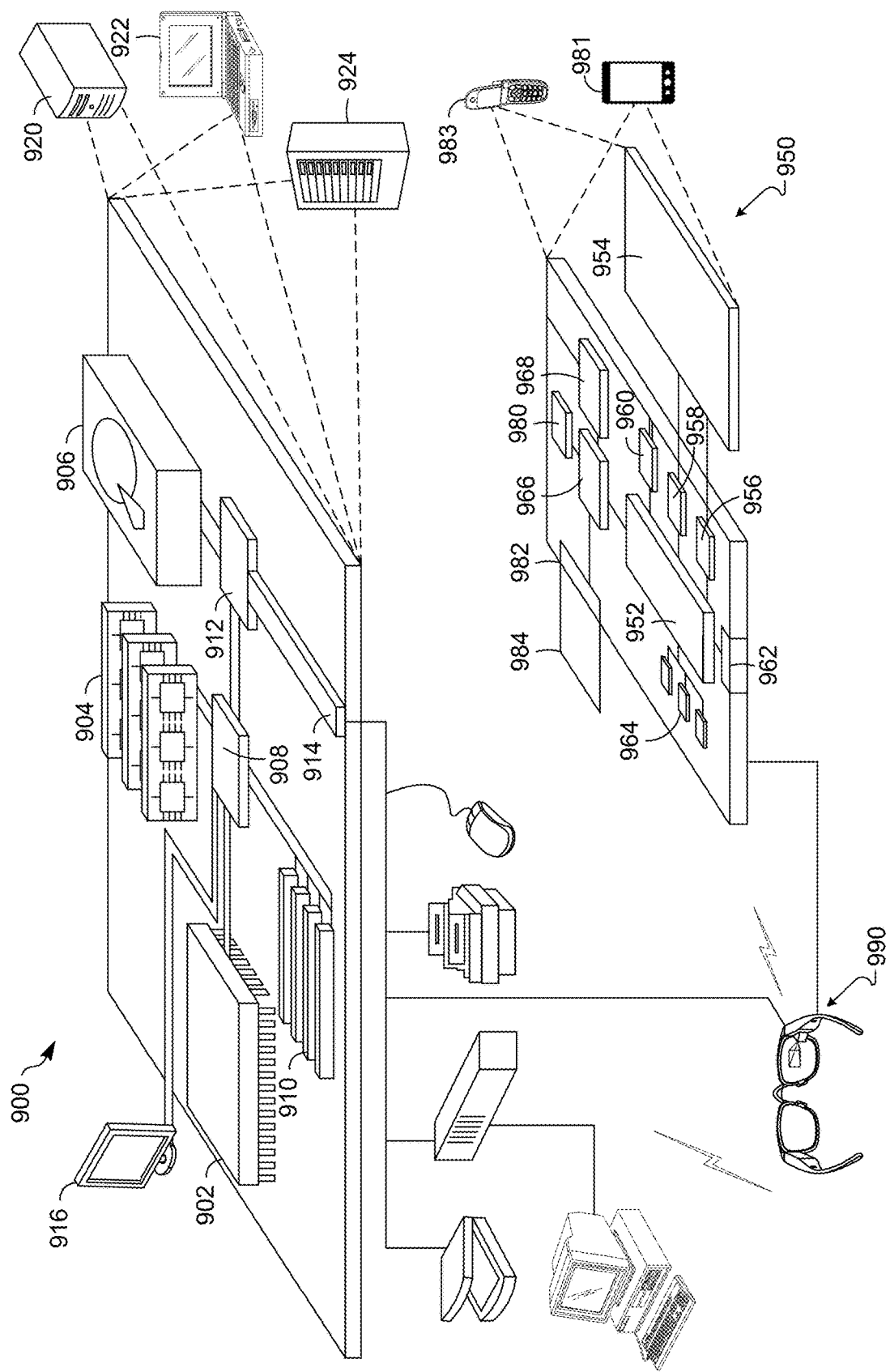
FIG. 9 illustrates example computing devices of the computing systems discussed herein.

FIG. 9 shows an example of a computing device 900 and a mobile computer device 950, which may be used with the techniques described here. Computing device 900 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk. In general, the computer-readable medium may be a non-transitory computer-readable medium.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, low power Bluetooth, Wi-Fi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 983. It may also be implemented as part of a smart phone 981, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 9 can include sensors that interface with an AR/VR headset (AR glasses/eyeglasses/VR headset/AR headset/IMD device 990). For example, one or more sensors included on computing device 950 or other computing device depicted in FIG. 9, can provide input to AR/VR headset 990 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 950 can use the sensors to determine an absolute position and/or a detected rotation of the computing device in the AR/VR space that can then be used as input to the AR/VR space. For example, computing device 950 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connected to, the computing device 950 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the AR/VR space can cause a particular action to occur in the AR/VR space.

In some embodiments, one or more output devices included on the computing device 950 can provide output and/or feedback to a user of the AR/VR headset 990 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 950 can be placed within AR/VR headset 990 to create an AR/VR system. AR/VR headset 990 can include one or more positioning elements that allow for the placement of computing device 950, such as smart phone 981, in the appropriate position within AR/VR headset 990. In such embodiments, the display of smart phone 981 can render stereoscopic images representing the AR/VR space or virtual environment.

In some embodiments, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the AR/VR space. As just one example, computing device can be a laser pointer. In such an example, computing device 950 appears as a virtual laser pointer in the computer-generated, 3D environment. As the user manipulates computing device 950, the user in the AR/VR space sees movement of the laser pointer. The user receives feedback from interactions with the computing device 950 in the AR/VR environment on the computing device 950 or on the AR/VR headset 990.

In some embodiments, a computing device 950 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method of detecting fit measurements for a wearable computing device, the method comprising:
    receiving, by an application executing on a computing device, a selection of a frame;
    detecting at least one feature of the frame worn by a user in a two-dimensional (2D) image captured by the computing device operated by the user;
    accessing configuration information associated with the frame;
    determining a three-dimensional pose of the frame captured in the image based on the detecting of the at least one feature and the configuration information associated with the frame; and
    determining a configuration of a display device of the wearable computing device based on the three-dimensional pose of the frame as captured in the image.

2. The method of claim 1, wherein detecting the at least one feature includes detecting at least one of:
    a bridge portion of the frame;
    a hinge point between a rim portion and an arm portion of the frame;
    a peripheral edge portion of a lens of the frame; or
    a saddle portion of the arm portion of the frame.

3. The method of claim 1, wherein determining the three-dimensional pose of the frame includes:
    accessing a three-dimensional model of the frame captured in the image; and
    performing a comparison, including comparing a known position and orientation of the at least one feature detected in the image to a corresponding position and orientation of the at least one feature in the three-dimensional model of the frame.

4. The method of claim 3, wherein
  detecting at least one feature includes detecting a plurality of features on the frame in the image captured by the computing device; and
  performing the comparison includes, for each of the plurality of features, comparing a known position and orientation of the feature detected in the image to a corresponding position and orientation of the feature in the three-dimensional model of the frame.

5. The method of claim 4, wherein determining the three-dimensional pose of the frame includes performing a correspondence between a two-dimensional position of each feature detected in the image to a corresponding three-dimensional position of the feature in the three-dimensional model of the frame.

6. The method of claim 1, further comprising:
  detecting a plurality of facial landmarks in the image captured by the computing device; and
  determining ophthalmic fit measurements for the wearable computing device based on the plurality of facial landmarks detected in the image.

7. The method of claim 6, wherein detecting the plurality of facial landmarks includes:
  detecting a pupil height in the image including the frame worn by the user;
  detecting at least one of an interpupillary distance or a monocular pupil distance in the image including the frame worn by the user; and
  determining a pantoscopic angle of the frame worn by the user based on the three-dimensional pose of the frame and the plurality of facial landmarks.

8. The method of claim 7, wherein determining the configuration of the display device of the wearable computing device based on the three-dimensional pose of the frame as captured in the image includes adapting the configuration of the display device of the wearable computing device to accommodate the ophthalmic fit measurements.

9. The method of claim 8, wherein determining the configuration of the display device of the wearable computing device includes:
  determining a field of view of the user based on the ophthalmic fit measurements and the three-dimensional pose of the frame; and
  configuring an output coupler of the display device such that content output by the display device is displayed within the field of view.

10. A non-transitory computer-readable medium storing executable instructions that, when executed by at least one processor, are configured to cause the at least one processor to:
  receive a selection of a frame;
  capture an image of the frame worn by a user;
  detect at least one feature of the frame from the image;
  access configuration information associated with the frame;
  determine a three-dimensional pose of the frame captured in the image based on detection of the at least one feature and the configuration information associated with the frame; and
  determine a configuration of a display device of a wearable computing device based on the three-dimensional pose of the frame as captured in the image.

11. The non-transitory computer-readable medium of claim 10, wherein the instructions cause the at least one processor to detect the at least one feature on the frame in the image, including at least one of:
  detect a first feature including a bridge portion of the frame;
  detect a second feature including a hinge portion between a rim portion and an arm portion of the frame;
  detect a third feature including a peripheral edge portion of a lens of the frame; or
  detect a fourth feature including a saddle portion of the arm portion of the fitting-frame.

12. The non-transitory computer-readable medium of claim 11, wherein the instructions cause the at least one processor to determine the three-dimensional pose of the frame, including:
  access a three-dimensional model of the frame captured in the image; and
  perform a comparison between a known position and orientation of the at least one feature detected in the image to a corresponding position and orientation of the at least one feature in the three-dimensional model of the frame.

13. The non-transitory computer-readable medium of claim 12, wherein the instructions cause the at least one processor to detect a plurality of features, and to perform the comparison, including, for each of the plurality of features:
  compare a known position and orientation of the feature detected in the image to a corresponding position and orientation of the feature in the three-dimensional model of the frame.

14. The non-transitory computer-readable medium of claim 13, wherein the instructions cause the at least one processor to determine the three-dimensional pose, including:
  performing a correspondence between a two-dimensional position of each feature detected in the image to a corresponding three-dimensional position of the feature in the three-dimensional model of the frame.

15. The non-transitory computer-readable medium of claim 10, wherein the instructions also cause the at least one processor to:
  detect a plurality of facial landmarks in the image; and
  determine ophthalmic fit measurements for the wearable computing device based on the plurality of facial landmarks detected in the image.

16. The non-transitory computer-readable medium of claim 15, wherein the instructions cause the at least one processor to detect the plurality of facial landmarks, including:
  detect a pupil height in the image including the frame worn by the user;
  detect at least one of an interpupillary distance or a monocular pupil distance in the image including the frame worn by the user; and
  determine a pantoscopic angle of the frame worn by the user based on the three-dimensional pose of the frame and the plurality of facial landmarks.

17. The non-transitory computer-readable medium of claim 16, wherein the instructions cause the at least one processor to adapt the configuration of the display device of the wearable computing device to accommodate the ophthalmic fit measurements, including:
  determine a field of view of the user based on the ophthalmic fit measurements and the three-dimensional pose of the frame; and
  configure an output coupler of the display device such that content output by the display device is displayed within the field of view.

* * * * *

UNITED STATES PATENT AND TRADEMARK OFFICE
CERTIFICATE OF CORRECTION

| | | |
|---|---|---|
| PATENT NO. | : 12,387,366 B2 | Page 1 of 1 |
| APPLICATION NO. | : 17/444963 | |
| DATED | : August 12, 2025 | |
| INVENTOR(S) | : Simmons et al. | |

It is certified that error appears in the above-identified patent and that said Letters Patent is hereby corrected as shown below:

In the Claims

In Column 28, Claim 11, Line 8, delete "fitting-frame." and insert -- frame. --, therefor.

Signed and Sealed this
Fourteenth Day of October, 2025

John A. Squires
*Director of the United States Patent and Trademark Office*